United States Patent

Ophardt

[19]

[11] Patent Number: 5,975,360
[45] Date of Patent: *Nov. 2, 1999

[54] CAPPED PISTON PUMP

[76] Inventor: Heiner Ophardt, 3474 Vinehaven Trail, Vineland, Ontario, Canada, L0R 2C0

[ * ] Notice: This patent is subject to a terminal disclaimer.

[21] Appl. No.: 08/874,688

[22] Filed: Jun. 13, 1997

Related U.S. Application Data

[63] Continuation-in-part of application No. 08/541,370, Oct. 10, 1995, Pat. No. 5,676,277, which is a continuation-in-part of application No. 08/355,920, Dec. 14, 1994, Pat. No. 5,489,044, which is a continuation-in-part of application No. 08/172,289, Dec. 23, 1993, abandoned, which is a continuation of application No. 07/980,208, Nov. 23, 1992, Pat. No. 5,282,552, which is a continuation-in-part of application No. 07/702,937, May 20, 1991, Pat. No. 5,165,577.

[30] Foreign Application Priority Data

Oct. 10, 1996 [WO] WIPO ............... PCT/CA9/600683

[51] Int. Cl.$^6$ ........................................................ B67D 5/00
[52] U.S. Cl. ................... 222/83; 222/181.1; 222/321.9; 222/325; 222/541.6; 222/563; 417/545; 417/547; 417/550
[58] Field of Search ............................... 222/81, 82, 83, 222/181.1, 181.3, 215, 320, 321.7, 321.8, 321.9, 325, 326, 327, 340, 378, 383.1, 385, 541.2, 541.6, 562, 563; 417/545, 547, 550

[56] References Cited

U.S. PATENT DOCUMENTS

| | | |
|---|---|---|
| 3,124,080 | 3/1964 | Sisson . |
| 3,132,776 | 5/1964 | Wasseberg . |
| 3,193,159 | 7/1965 | Swindler . |
| 3,926,348 | 12/1975 | Lutzker ................................... 222/563 |
| 4,046,495 | 9/1977 | Grimm, Jr. . |
| 4,106,656 | 8/1978 | Babiol ..................................... 222/563 |
| 4,118,152 | 10/1978 | Bron . |
| 4,207,990 | 6/1980 | Weiler et al. ........................ 222/541.6 |
| 4,360,130 | 11/1982 | Nishimura et al. . |
| 4,364,718 | 12/1982 | Beun et al. . |
| 4,493,440 | 1/1985 | Von Buelow . |
| 4,548,340 | 10/1985 | Messer . |
| 4,589,573 | 5/1986 | Tada . |
| 4,615,361 | 10/1986 | Bartle, Sr. . |
| 4,615,476 | 10/1986 | Hobbs et al. . |
| 4,621,749 | 11/1986 | Kanfer . |
| 4,646,945 | 3/1987 | Steiner et al. . |
| 4,651,902 | 3/1987 | Hobbs et al. . |
| 4,673,109 | 6/1987 | Cassia . |

(List continued on next page.)

FOREIGN PATENT DOCUMENTS

| | | |
|---|---|---|
| 506705 | 10/1954 | Canada . |
| 2314110 | 1/1977 | France . |
| 2315018 | 1/1977 | France . |
| 1528603 | 10/1954 | Germany . |
| 1548946 | 10/1970 | Germany . |
| 2513766 | 9/1975 | Germany . |
| 2727679 | 11/1978 | Germany . |
| 3333569 | 3/1985 | Germany . |
| 3926855 | 2/1990 | Germany . |
| 607483 | 8/1960 | Italy . |

*Primary Examiner*—Joseph A. Kaufman
*Attorney, Agent, or Firm*—Riches, McKenzie & Herbert

[57] ABSTRACT

A disposable plastic pump for dispensing liquids is disclosed which comprises two basic unitary, preferably all plastic, elements: a chamber forming body having an open outer end and an inner end in fluid communication with a liquid reservoir, and a piston formed to slidably fit into the chamber. The chamber forms two axially adjacent coaxial chambers, an inner chamber of one diameter and an outer chamber of a different diameter. The piston comprises a stem on which is located two spaced flexing disc each sized to fit in and serving as a one-way valve in the inner chamber and outer chamber, respectively, permitting fluids to flow outwardly past each flexing disc. A sealing disc is located on the stem outwardly of the outermost flexing disc. A passageway is provided from an inlet on the piston between the outermost flexing disc and the sealing disc through which the dispensed liquid flow.

20 Claims, 19 Drawing Sheets

U.S. PATENT DOCUMENTS

| | | | |
|---|---|---|---|
| 4,706,827 | 11/1987 | Cabernoch et al. | 222/83 |
| 4,762,475 | 8/1988 | Fuchs . | |
| 4,993,600 | 2/1991 | Tucker et al. | 222/321 |
| 5,051,073 | 9/1991 | Newbold . | |
| 5,110,041 | 5/1992 | Keeler | 222/562 |
| 5,111,970 | 5/1992 | Rutter et al. | 222/83 |
| 5,127,550 | 7/1992 | Knorr | 222/83 |
| 5,165,577 | 11/1992 | Ophardt . | |
| 5,165,578 | 11/1992 | Laible . | |
| 5,213,860 | 5/1993 | Laing | 222/541.6 |
| 5,261,565 | 11/1993 | Drobish et al. . | |
| 5,261,571 | 11/1993 | Goncalves | 222/214 |
| 5,282,552 | 2/1994 | Ophardt | 222/181.2 |
| 5,320,253 | 6/1994 | Robinson . | |
| 5,373,970 | 12/1994 | Ophardt | 222/181 |
| 5,435,462 | 7/1995 | Fujii | 222/82 |
| 5,489,044 | 2/1996 | Ophardt | 222/181.2 |
| 5,676,277 | 10/1997 | Ophart | 222/181.2 |

CAPPED PISTON PUMP

RELATED APPLICATIONS

This application is a continuation-in-part of U.S. patent application Ser. No. 08/541,370, filed Oct. 10, 1995 now U.S. Pat. No. 5,676,277, which is a continuation-in-part of U.S. patent application Ser. No. 08/355,920 filed Dec. 14, 1994 now U.S. Pat. No. 5,489,044, which is a continuation-in-part of U.S. patent application Ser. No. 08/172,289, filed Dec. 23, 1993 now abandoned, which is a continuation of U.S. patent application Ser. No. 07/980,208, filed Nov. 23, 1992, now U.S. Pat. No. 5,282,552 which issued Feb. 1, 1994, which is a continuation-in-part of U.S. patent application Ser. No. 07/702,937 filed May 20, 1991, now U.S. Pat. No. 5,165,577 which issued Nov. 24, 1992.

SCOPE OF THE INVENTION

This invention relates generally to a disposable plastic pump and, more particularly, to an inexpensive, preferably all plastic, disposable pump assembly for dispensing flowable materials.

BACKGROUND OF THE INVENTION

Many pump assemblies are known for dispensing hand soap. Typically, even the simplest of these assemblies include at least four separate elements, a chamber forming body, two one-way valves and a piston. These pumps suffer the disadvantage that they have a number of individual parts and cost typically increases with the number of parts and the assembly required.

Known disposable pump assemblies for dispensing hand soap typically include at least some metal parts such as metal balls for one-way valves and metal springs to bias one-way valves closed. The inclusion of metal parts suffers the disadvantage that the pump assemblies cannot merely be ground up in plastic grinders for recycling in that the metal parts are not compatible with most plastic grinding machines.

Known hand soap dispensing systems provide replaceable receptacles for liquid soap with permanent pump assemblies to pump soap from the receptacles. This has the disadvantage that the pumps are expensive and after prolonged usage may fail or require cleaning and maintenance.

SUMMARY OF THE INVENTION

To at least partially overcome these disadvantages of known liquid containers and pumps, the present invention provides a pump assembly for dispensing liquids with a novel, unitary construction for a piston so that the pump will have as few separate parts as possible, preferably fewer than four, which may be easily assembled.

Another object is to provide a unique configuration for an inexpensive disposable piston for a disposable pump which can be injection molded, as a unitary element entirely from plastic yet incorporate one or more one-way valves.

Another object is to provide a disposable plastic pump assembly formed entirely from two or three unitary plastic elements without any metal parts.

Another object is to provide a system for dispensing hand soap comprising a permanent housing and pump activator and a disposable soap reservoir and pump assembly.

A further object is to provide a liquid reservoir or container having improved drop strength, a longer shelf life and in which air pockets are eliminated which might otherwise enter the pump assembly and prevent the flow of liquids therefrom.

Another object is to provide a disposable pump for dispensing liquids, adapted to be used with a disposable fluid container, which may be readily recycled without first requiring disassembly of the parts of the pump prior to crushing or shredding of the disposed container-pump assembly.

Another object is to provide a piston with a cutting member to peirce a membrane to provide communication with a fluid reservoir.

Another object is to provide a construction for a fluid pump which maintains the piston in a sealed contamination-free environment.

Another object is to provide a simple removable closure member which seals the outlet of the pump.

The present invention provides an inexpensive, easy to assemble, disposable pump for dispensing liquids, from reservoir, preferably a disposable reservoir.

The pump comprises two basic elements: a chamber forming body and a piston.

The piston is formed to be slidably received in the chamber and comprises a stem. The piston has at least one flexing element on the stem, which serves as a one-way valve permitting fluid flow only outwardly past the flexing element. A sealing element which forms a substantially fluid impermeable seal between the sealing element and chamber is located outward on the stem from the outwardmost flexing element. A channel is provided from an inlet on the piston between the outwardmost flexing element and the sealing element to permit fluid flow to an outlet outward of the sealing means.

Liquids are drawn from the reservoir by the outward and inward movement of the piston. Fluids are drawn from the reservoir, past a first one-way valve device and into the chamber. In subsequent movement, the first one-way valve device prevents fluid from flowing back into the reservoir. With the outermost flexing element bending to allow liquid to pass outwardly therepast, liquid is pumped out via the channel.

In a first embodiment, the cylindrical chamber has a constant diameter, the piston has a single flexing element on the stem and a separate one-way valve is provided between an inner end of the chamber and the reservoir. In another embodiment, the chamber is a stepped chamber with an inner cylindrical chamber of a different diameter compared to an outer cylindrical chamber and two axially spaced flexing elements are provided on the stem with the flexing elements and the stepped cylinder configuration providing the first one-way valve device.

After exhaustion of the liquids contained in the reservoir, the reservoir is replaced, preferably together with a new pump assembly attached. Preferably both the reservoir and the pump are formed entirely of plastic so as to permit easy recycling of the plastic parts.

The piston is provided with a unique combination of features which permits it to be injection molded from plastic as a unitary element yet incorporate one or more one-way valve forming features.

The present invention also provided for a system for dispensing liquids having: a disposable plastic element suitable for recycling comprising a disposable liquid reservoir and a disposable pump assembly each formed entirely out of recyclable plastic, and a permanent non-disposable housing for the reservoir and pump assembly including a permanent actuating system to operate the pump assembly. Any non-recycleable or metal parts are incorporated into the permanent housing to ensure the disposable parts can be readily recycled.

In one aspect, the present invention provides a pump for dispensing liquid from a reservoir comprising:

piston-chamber forming means having an inner cylindrical chamber and an outer cylindrical chamber, the inner chamber and outer chamber each having a diameter, a chamber wall, an inner end and an outer end, the diameter of the inner chamber being different than the diameter of the outer chamber, the inner chamber and outer chamber being coaxial with the outer end of the inner chamber opening into the inner end of the outer chamber, the inner end of the inner chamber in fluid communication with the reservoir, a piston-forming element received in the piston-chamber forming means axially slidable inwardly and outwardly therein, said piston-forming element being generally cylindrical in cross-section with a central axially extending hollow stem having a central passageway closed at an inner end and having an outlet proximate an outer end, an inner circular flexing disc extending radially outwardly from the stem proximate the inner end, the inner flexing disc having an elastically deformable edge portion proximate the chamber wall of the inner chamber circumferentially thereabout, an outer circular flexing disc extending radially outwardly from the stem spaced axially outwardly from the inner flexing disc, the outer flexing disc having an elastically deformable edge portion proximate the chamber wall of the outer chamber circumferentially thereabout, a circular sealing disc extending radially outwardly from the stem spaced axially outwardly from the outer flexing disc, the sealing disc engaging the chamber wall of the outer chamber circumferentially thereabout to form a substantially fluid impermeable seal therewith on sliding of said piston-forming element inwardly and outwardly, an inlet located on the stem between the outer flexing disc and the sealing disc in communication with the passageway, the piston-forming element slidably received in the piston-chamber forming means for reciprocal axial inward and outward movement therein with the inner flexing disc in the inner chamber and the outer flexing disc and sealing disc in the outer chamber, the inner flexing disc substantially preventing fluid flow in the inner chamber past the inner flexing disc in an inward direction, the outer flexing disc substantially preventing fluid flow in the outer chamber past the outer flexing disc in an inward direction, the inner flexing disc elastically deforming away from the chamber wall of the inner chamber to permit fluid flow in the inner chamber past the inner flexing disc in an outward direction, the outer flexing disc elastically deforming away from the chamber wall of the outer chamber to permit fluid flow in the outer chamber past the outer flexing disc in an outward direction.

BRIEF DESCRIPTION OF THE DRAWINGS

Further objects and advantages of the invention will appear from the following description taken together with the accompanying drawings in which.

Figure 2:
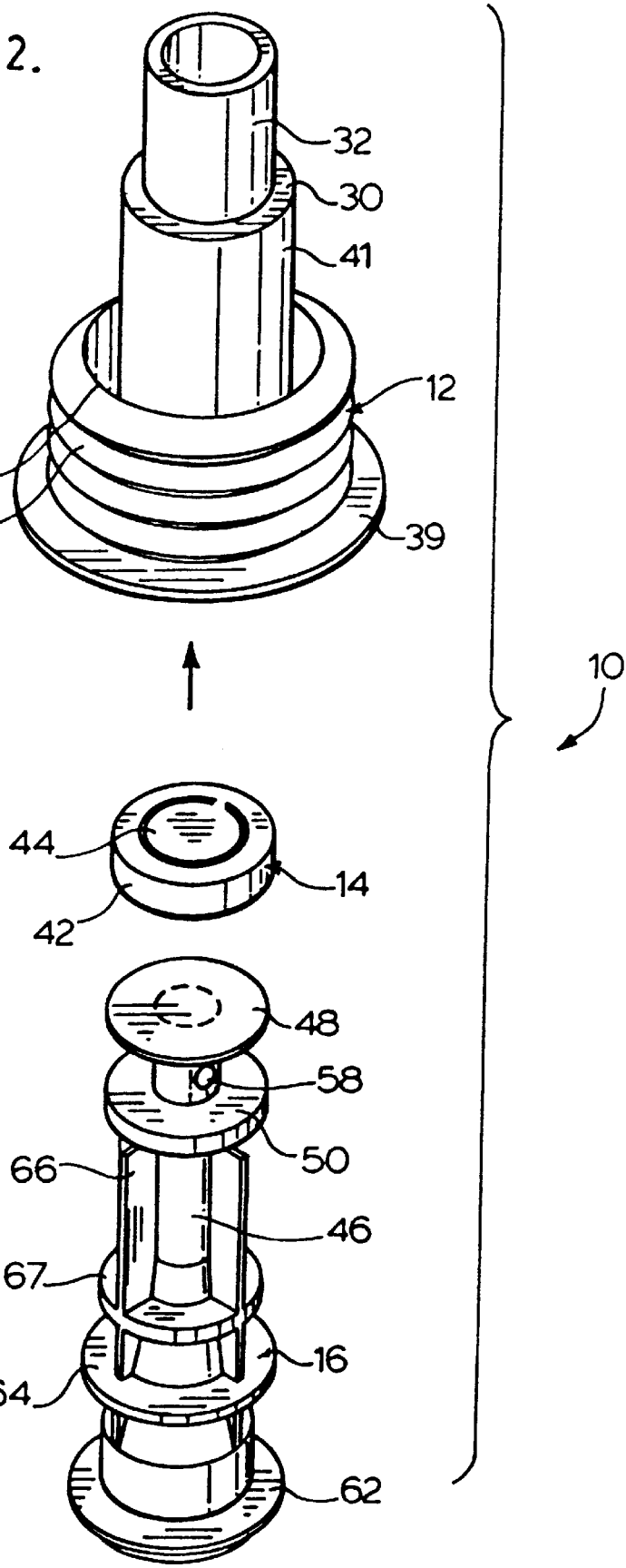
FIG. 2 is a partially exploded perspective view of the preferred embodiment of the pump assembly shown in FIG. 1.
Figure 3:
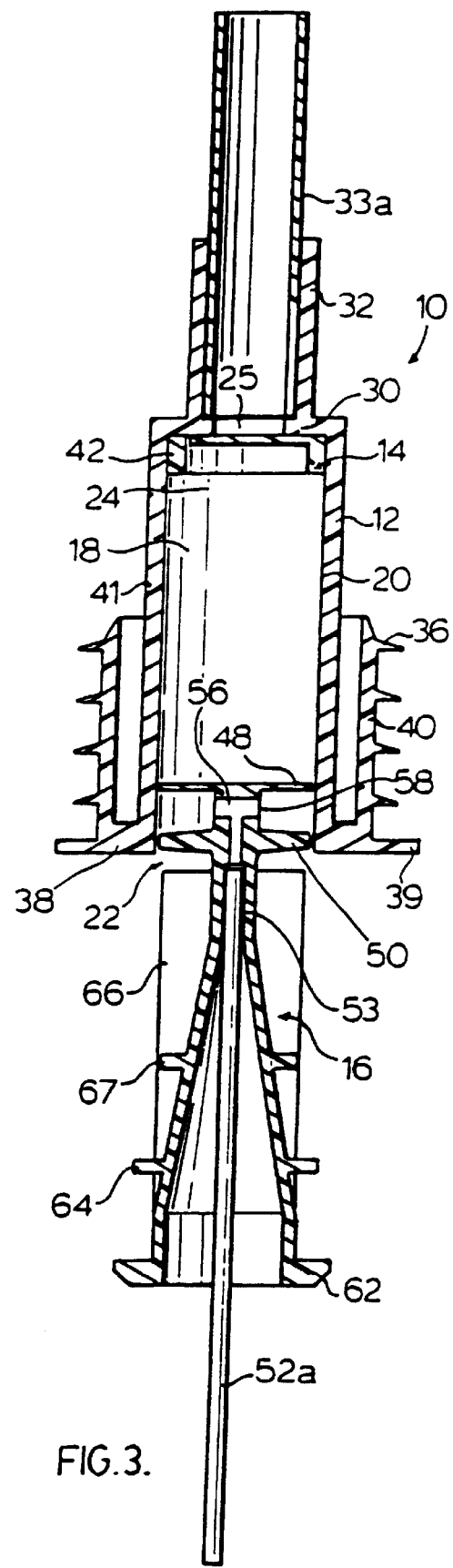
FIG. 3 is a cross-sectional side view of an assembled pump assembly of FIG. 2.

Reference is made first to FIGS. 2 and 3 which show a pump assembly generally indicated 10. Pump assembly 10 is best shown in FIG. 2 as comprising three principal elements, a piston chamber forming body 12, a one-way valve 14 and a piston 16.

In essence body 12 has a cylindrical inner chamber 18 with the one-way valve 14 secured at an inner end 24 of the chamber 18. Piston 16 is axially slidably received in chamber 18 for reciprocal sliding movement inwardly and outwardly of an open end 22 of chamber 18. Body 12 not only carries the one-way valve 14 and piston 16 but is also adapted to be frictionally engaged into a cylindrical neck 34 of the fluid reservoir 26 shown in FIG. 1. With the pump assembly 10 coupled to reservoir 26, reciprocal movement of piston 16 will pump fluid from the reservoir 26 through piston 16.

As seen in FIG. 2 body 12 is generally cylindrical in cross-section and symmetrical about its central axis. Body 12 has an inner cylindrical portion 41 forming the chamber 18 and, disposed coaxially thereabout and spaced therefrom an outer cylindrical portion 40. The inner and outer cylindrical portions are joined by a disc-like rim 38 extending radially outwardly about open end 22 of chamber 18. Sealing and gripping flanges 36 are provided about the outer cylindrical portion 40 to assist in frictionally engaging the inner surfaces of reservoir neck 34 and form a fluid impermeable seal therewith. Rim 38 continues radially outwardly past flanges 36 as stop flange 39 which serve to limit insertion of body 12 into reservoir neck 34.

Chamber 18 is disposed coaxially within inner cylindrical portion 41, with the chamber 18 terminating at its inner end 24 at a radially inwardly extending inner shoulder 30 with a central opening 25 therethrough. Hollow, cylindrical intake extension 32 shown as being of a lesser diameter extends axially away from shoulder 30.

One-way valve 14 is best shown in FIG. 2 to comprise an annular ring 42 having a coaxially located flexible circular flap 44 hingedly connected thereto. In assembly, as seen in FIG. 3, the one-way valve 14 is slidably inserted into the chamber 18 to abut the inner shoulder 30. Preferably, one-way valve 14 is formed entirely of plastic and is formed by injection molding. The abutting inner shoulder 30 disposed between the one-way valve 14 and the reservoir 26 is sized to have a smaller radius than the radius of the circular flap 44, so as to prevent bending of the circular flap 44 inward towards the reservoir 26. The circular flap 44 is free to bend outwardly and thus permit only outward flow of fluid 28 from the reservoir 26 into chamber 18. The chamber 18 and one-way valve 14 are assembled such that the circumferential surface of annular ring 42 engages the chamber wall 20 in a friction fit relationship.

As best seen in FIG. 2, piston 16 is generally cylindrical in cross-section and adapted to be slidably received in chamber 18. Piston 16 is a unitary element formed entirely of plastic preferably by injection molding. Piston 16 has a central hollow stem 46 extending along the central longitudinal axis of the piston 16. A circular resilient flexing disc 48 is located at the inwardmost end of the piston 16 and extends radially therefrom. Flexing disc 48 is sized to circumferentially abut the cylindrical inner chamber wall 20 substantially preventing fluid flow therebetween.

A circular sealing disc 50 is located on the stem 46 spaced axially outwardly from the flexing disc 48. The sealing disc 50 extends radially outward from the stem 46 to circumferentially engage the chamber wall 20 to form a substantially fluid impermeable seal therebetween. Sealing disc 50 is formed sufficiently rigid so as to resist deformation, maintaining a substantially fluid impermeable seal with the chamber wall 20 on sliding the piston 16 in and out of the chamber 18.

Piston stem 46 has a central hollow passage 52 extending along the axis of the piston 16 from an inner end located in the stem 46 between the flexing disc 48 and the sealing disc 50, to an outlet 54 at the outer end of the piston 16. A channel 56 passes from inlets 58 located on either side of the stem 46 between the flexing disc 48 and the sealing disc 50, radially inward through the piston 16 to communicate with central passage 52. The chamber 56 and central passage 52 permit fluid communication through the piston 16, past the sealing disc 50, between the inlets 58 and the outlet 54.

As best shown in FIGS. 2 and 3, an outer circular engagement flange 62 is provided on the outermost end of the stem 46 which extends radially outwardly from about the outlet 54. As discussed later flange 62 may be engaged by an actuating device in order to move the piston 16 in and out of the body 12.

A circular stopping disc 64 is provided on the stem 46 between the flange 62 and the sealing disc 50 extending radially outward from the stem 46. Stopping disc 64 has a radius greater than the radius of the chamber 18 such that the stopping disc 64 limits inward movement of piston 16 by abutment of the stopping disc 64 with rim 38 about outer end 22 of the body 18.

Axially extending webs 66 and circumferential ribs 67 are provided to extend radially from stem 46. These webs 66 and rib 67 engage chamber wall 20 so as to assist in maintaining the piston 16 in an axially centered and aligned position when sliding in an out of the chamber 18.

Figure 4:
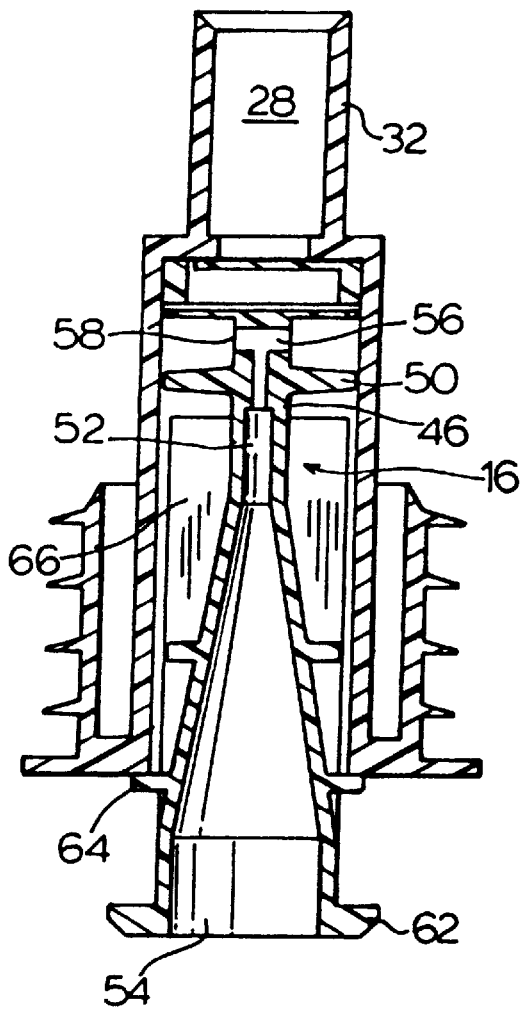
FIG. 4 is a cross-sectional side view similar to FIG. 3 but with the dispensing piston in the fully inserted position.
Figure 5:
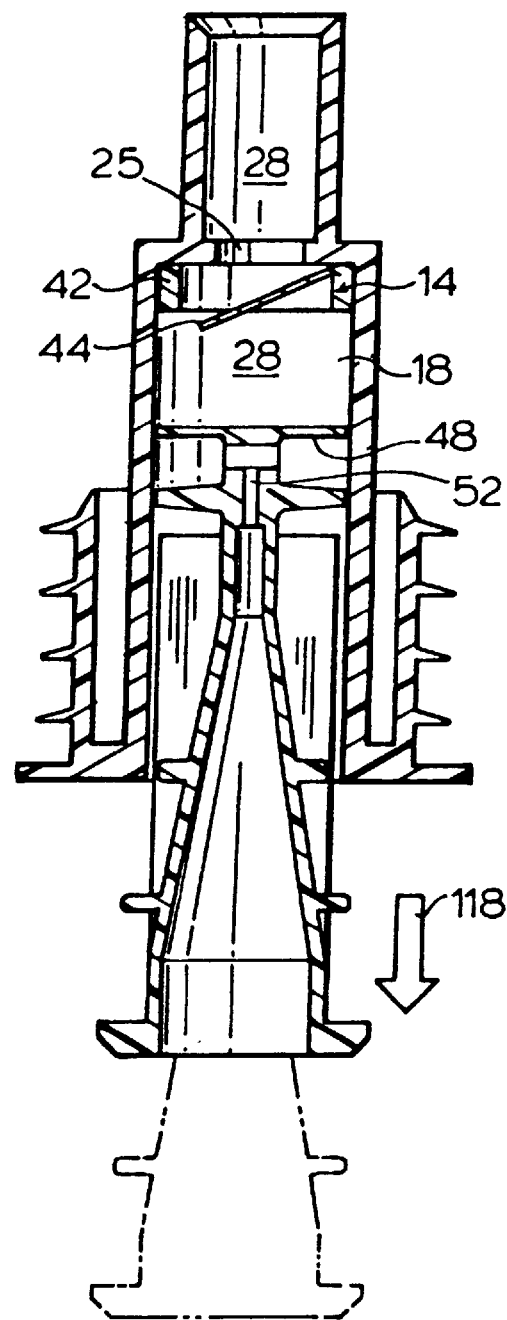
FIG. 5 is a cross-sectional side view similar to FIG. 3 but with the dispensing piston in a partially extended position in a withdrawn stroke.
Figure 6:
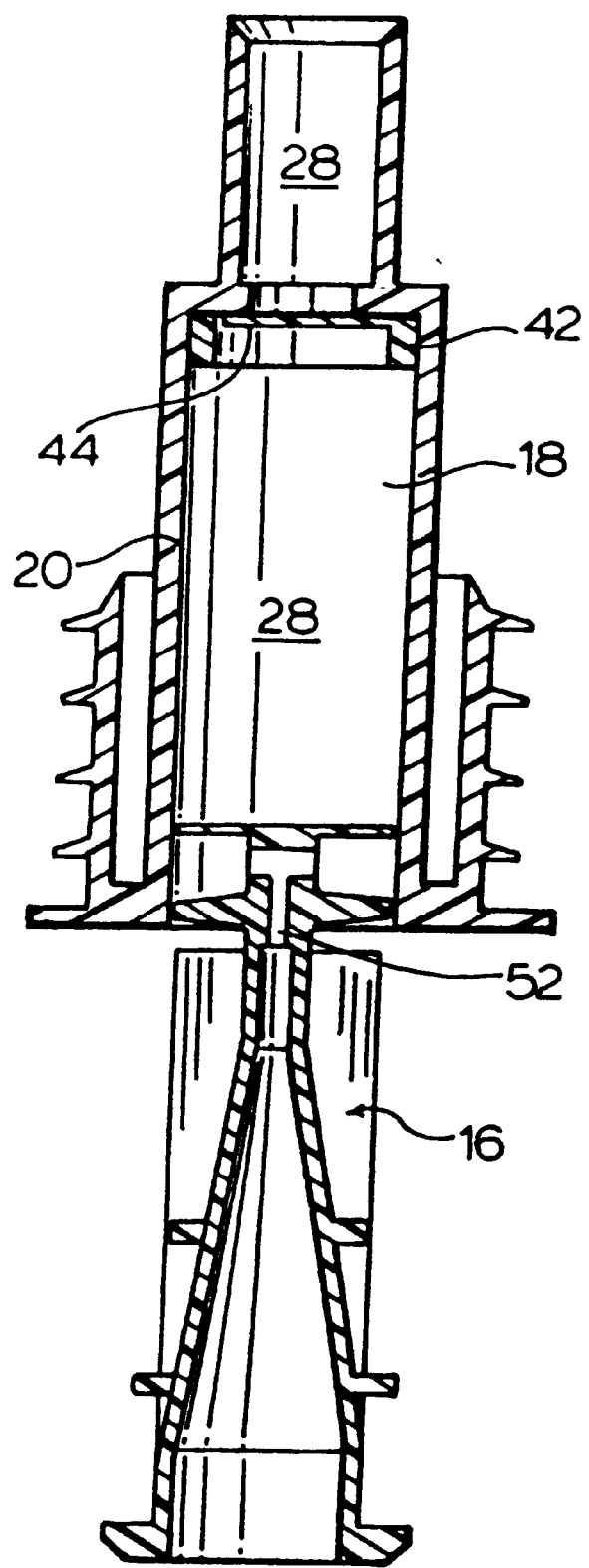
FIG. 6 is a cross-sectional side view similar to FIG. 3 but with the dispensing piston in a fully withdrawn position.
Figure 7:
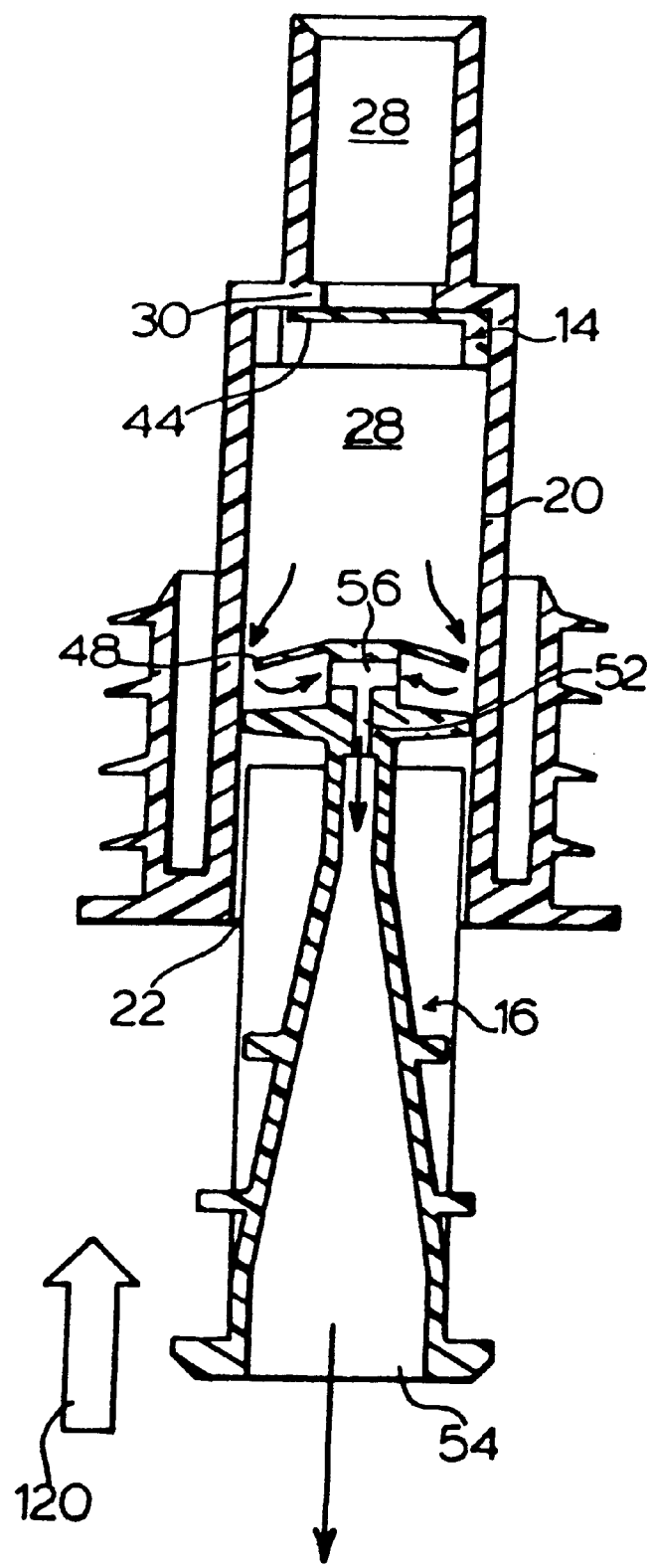
FIG. 7 is a cross-sectional side view similar to FIG. 3 but with the dispensing piston in a partially inserted position in a return stroke.

Operation of the pump assembly 10 is now described with particular reference to FIGS. 4, 5, 6 and 7. FIG. 4 shows the pump assembly with piston 16 in a fully retracted position. FIG. 6 shows the pump assembly with piston 16 in a fully withdrawn position. FIG. 5 shows the pump assembly with piston 16 during a withdrawn stroke moving in the direction of arrow 118 from the retracted position of FIG. 4 to the withdrawn position of FIG. 6. FIG. 7 shows the pump assembly with piston 16 during a return stroke moving in the direction of arrow 120 from the withdrawn position of FIG. 6 to the retracted position of FIG. 4. Repeated pumping action results by repeatedly cycling the pump assembly through the positions in sequence of FIGS. 4, 5, 6 and 7.

During the withdrawal or out stroke of FIG. 5, the withdrawal of the piston causes one-way valve 14 to open with fluid to flow into chamber 18 past open flap 44. In the withdrawal stroke, flexing disc 48 remains substantially undeflected and assists in creating suction forces in chamber 18 to open flap 44 and draw fluid into chamber 18 past flap 44.

During the return stroke of FIG. 7, the return of piston 16 pressurizes fluid in chamber 18 between the piston and one-way valve 14. This pressure urges flap 44 to a closed position abutting shoulder 30. As a result of this pressure, flexing disc 48 deflects its periphery as indicated in FIG. 7 so as to come out of sealing engagement with chamber walls 20 and permit fluid to flow past disc 48 and out of chamber 18 via passage 52 and channel 56 and passage 52.

The flexing disc 48 needs, on one hand, to substantially prevent flow therepast in the withdrawal stroke and, on the other hand, deform to permit flow therepast in the return stroke. The disc 48 shown facilitates this by being formed as a thin resilient disc, in effect, having an elastically deformable edge portion near chamber wall 20.

When not deformed, flexing disc 48 abuts chamber wall 20 to form a substantially fluid impermeable seal. When deformed, as by its edge portion being bent away from wall 20, fluid may flow past the disc. Disc 48 is deformed when the pressure differential across it, that is, the difference between the pressure on one side and pressure on the other side, is greater than a maximum pressure differential which the disc can withstand without deflecting. When the pressure differential is greater than this maximum pressure differential, the disc deforms and fluid flows past. When the pressure differential reduces to less than this maximum pressure differential, the disc returns to its original shape substantially forming a seal with wall 20.

With a simple disc 48 of thin plastic as shown, the overall configuration of the pump assembly needs to be considered to achieve best results. For example, in a withdrawal stroke, the resistance of fluid flow into chamber 18 past the one-way valve 14 compared to the resistance to fluid flow back up channel 56 and passage 52 will affect the relative pressures on each side of the disc 48 and whether the disc will be deflected. Preferably, the pump assembly is to be designed having regard to the viscosity of the fluid, the resistance to flow outwardly through one-way valve and the resistance to flow back inwardly through the piston 16 as well as the relative resiliency of the disc 48 so that in operation, the flexing disc prevents fluid flow therepast in the outward stroke yet permits fluid flow therepast in the return stroke.

Disc 48 may be designed to resist deformation in one direction compared to the other so as to assist in achieving the desired operation.

Figure 1:
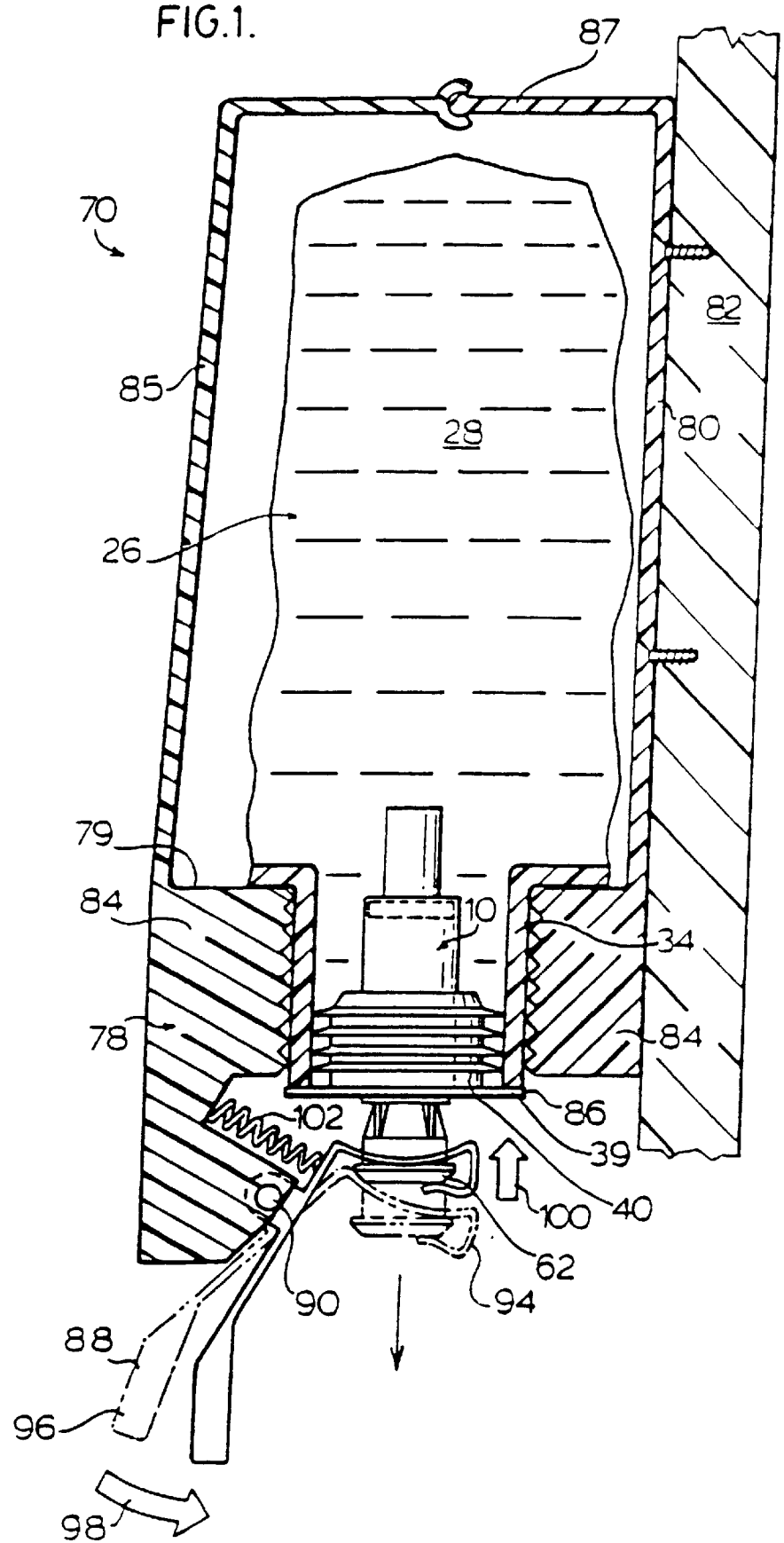
FIG. 1 is a partially cut away side view of a first preferred embodiment of a liquid dispenser with the reservoir and pump assembly in accordance with a first aspect of the present invention.

Reference is now made to FIG. 1 which shows a liquid soap dispenser generally indicated 70 utilizing pump assembly 10 and reservoir 26 with pump assembly 10 inserted into neck 34 of reservoir 26. Dispenser 70 has a housing generally indicated 78 to receive and support the pump assembly 10 and reservoir 26. Housing 78 is shown with a back plate 80 for mounting the housing, for example, to a building wall 82. A bottom support plate 84 extends forwardly from the back plate to receive and support the reservoir 26 and pump assembly 10. As shown, bottom support plate 84 has a circular opening 86 therethrough. The reservoir 26 sits, supported on plate 79 with its neck 34 extending through opening 86 and secured in the opening as by friction fit, clamping and the like. A cover member 85 is hinged to an upper forward extension 87 of back plate 80, so as to permit replacement of reservoir 26 and its pump assembly 10.

Bottom plate 84 carries at a forward portion thereof an actuating lever 88 journalled for pivoting about a horizontal axis at 90. An upper end of lever 88 carries a hook 94 to engage engagement flange 62 and couple lever 88 to piston 16, such that movement of the lower handle end 96 of lever 88 from the solid to the dotted line position, in the direction indicated by arrow 98 slides piston inwardly in a return, pumping stroke as indicated by arrow 100. On release of lower handle end 96, spring 102 biases the upper portion of lever 88 downwardly so that the lever 88 draws piston 16 outwardly to a fully withdrawn position as seen in solid lines in FIG. 1. Lever 88 and its inner hook 94 are adapted to permit manually coupling and uncoupling of the hook 94 as is necessary to remove and replace reservoir 26 and pump assembly 10.

In use of the dispenser 70, once exhausted, the empty reservoir 26 together with its attached pump 10 are removed and a new reservoir 26 and attached pump 10 are inserted into the housing. Preferably, the removed reservoir 26 and attached pump 10 is made entirely of recyclable plastic material which may easily be recycled without the need for disassembly prior to cutting and shredding.

FIG. 3 shows two tubular extensions of the pump assembly which are not shown in the other Figures.

Firstly, an inlet extension tube 33a may be provided as a separate cylindrical plastic tube which has an outer diameter sized to frictionally engage in sealed relation in hollow, cylindrical intake extension 32. Such an intake extension tube 33a may be necessary if the pump assembly is used in a dispenser configuration (not shown) as where the fluid level is either below the pump assembly or spaced from the pump assembly.

Secondly, an outlet extension tube 52a may be provided as a separate cylindrical plastic tube which has an outer diameter sized to frictionally engage in sealed relation in a hollow cylindrical portion 53 of channel 52 in the stem 46 of the piston 16. Such an outlet extension tube 52a may be useful to direct, more particularly, the location of discharge of the pump, or if the pump pumps fluid upwardly, then the tube may be bent as a spout.

While the preferred embodiment of FIG. 2 shows a plastic cylindrical piston-chamber 12 and piston 16, piston-chambers and pistons of other symmetrical and non-symmetrical shapes and materials may also be used.

Although a piston-chamber 12 having a stop flange 39 and outer cylindrical portion 40 having gripping flanges 36 is preferred, the gripping flanges 36 or other gripping means could be provided elsewhere on the piston-chamber 12.

While the preferred embodiment of FIG. 3 shows a channel 56 passing from an inlet 58 on the stem 46 of the piston 16 and connecting with an axially aligned central passage 52, the channel 56 could also be provided permitting fluid communication outward past the sealing disc 50 without connecting with a central passage and without an inlet 58 disposed on the stem 46 of the piston 16.

Figure 8:
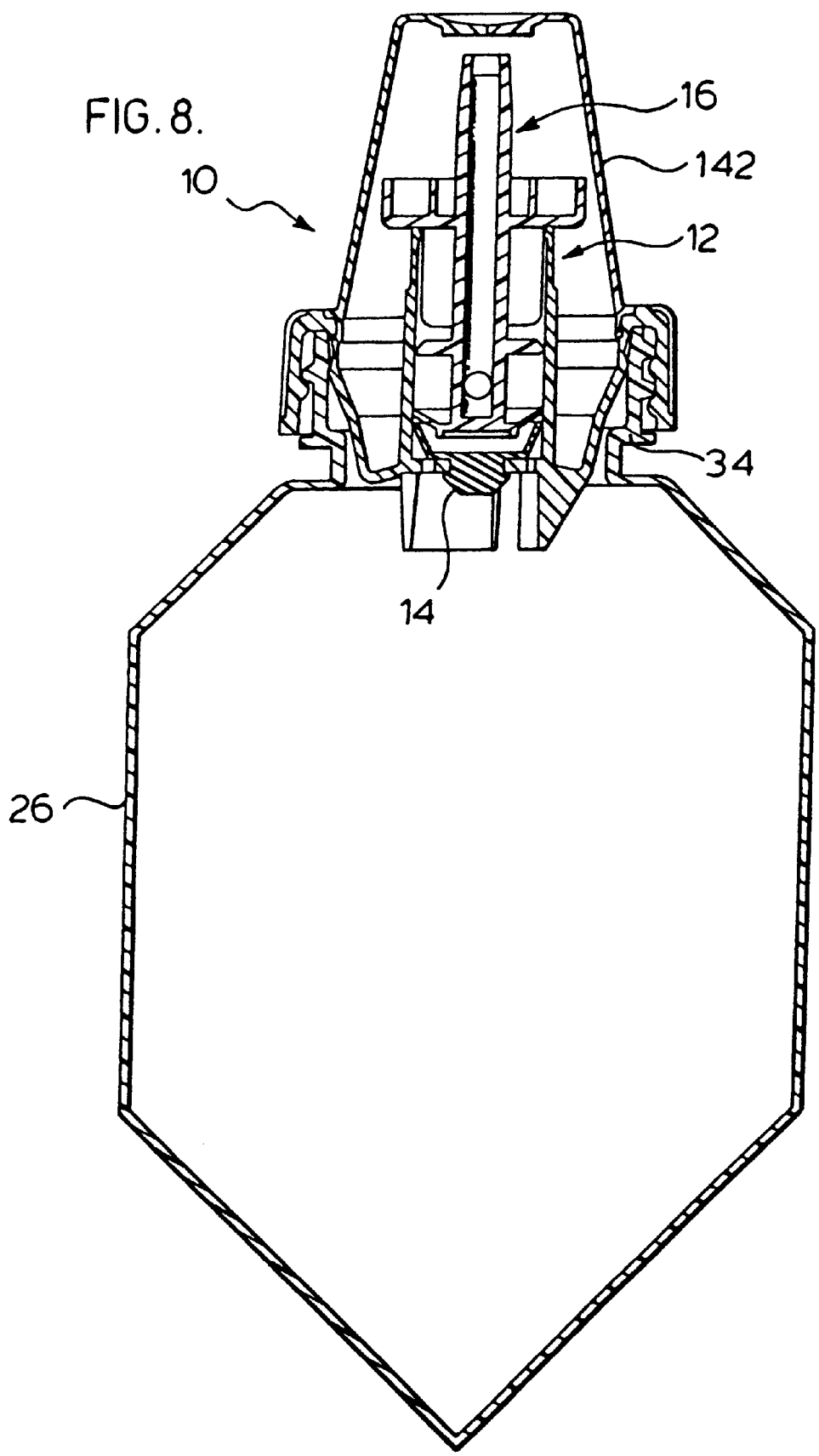
FIG. 8 is a cross-sectional side view of a second preferred embodiment of a liquid dispenser in accordance with the first aspect of the present invention and further showing a cover for use in vacuum evacuation in accordance with a second aspect of the invention.
Figure 9:
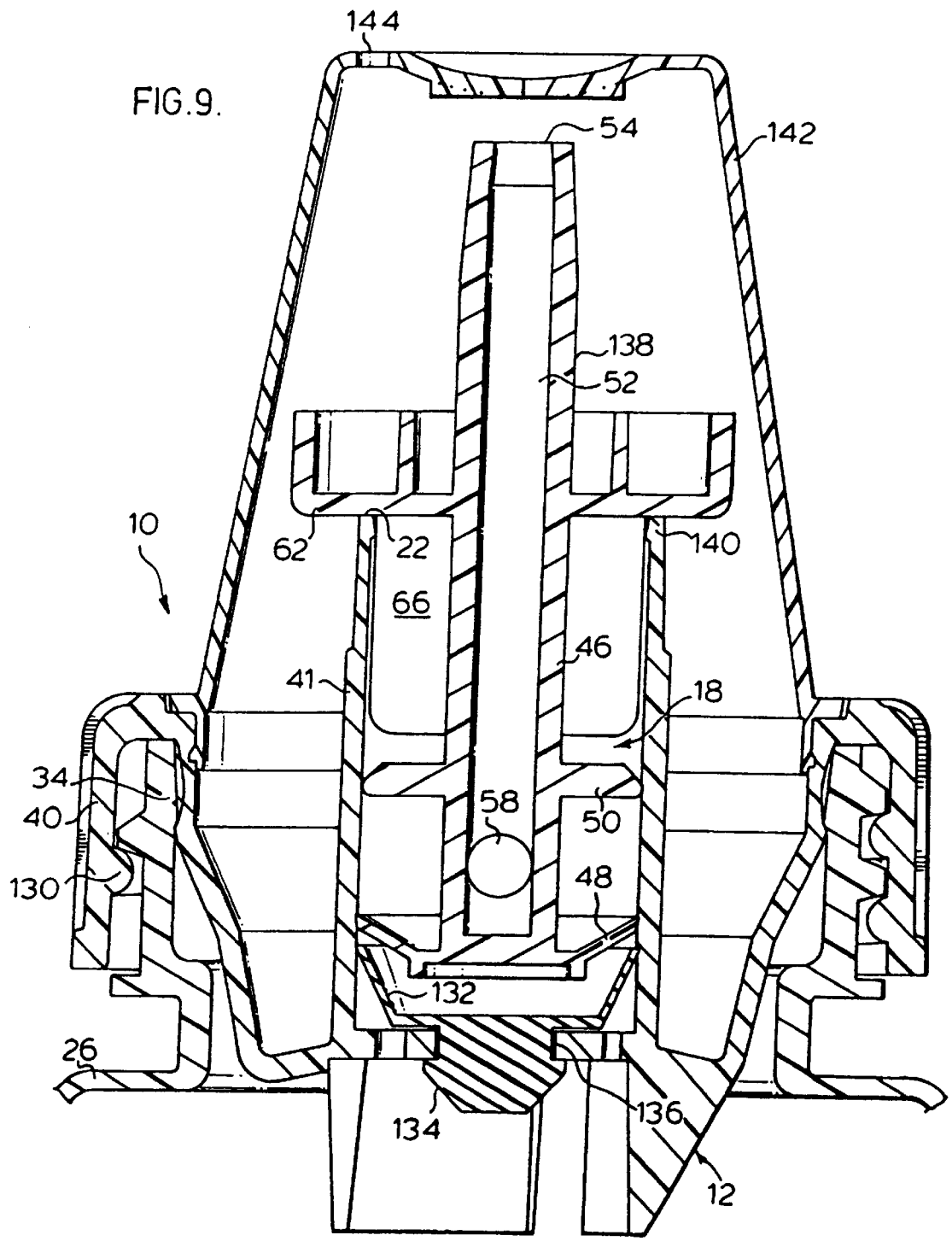
FIG. 9 is an enlarged cross-sectional side view of the pump and cover assembly of the liquid dispenser of FIG. 6.

Reference is now made to FIGS. 8 and 9 which show a second embodiment of a pump in accordance with a first aspect of the invention having a piston equivalent to the piston in FIG. 1. In FIGS. 8 and 9, similar reference numerals are used to indicate similar elements to those in the first embodiment of FIG. 1.

As seen in FIGS. 8 and 9, the pump assembly is similar in construction and functionality to that in FIG. 1. Pump assembly 10 is shown secured to a collapsible plastic container 26 having a threaded neck 34. The pump assembly 10 has body 12, one-way valve 14, and piston 16. Body 12 is configured with internal threads 130 on outer cylindrical chamber 18 and comprises an unitary piece of resilient material having a resilient, flexible, annular rim 132 for engagement with the side walls of the chamber 18. The one-way valve is integrally formed with a shouldered button 134 which is secured in snap fit inside an opening 136 in the central bottom wall of chamber 18.

The piston 16 is similar to that in FIG. 1 having stem 46 carrying flexing disc 48, sealing disc 50 and webs 66. The stem 46 has passage 52, outlet 54, and inlet 58. In FIGS. 8 and 9, the engagement flange 62 is enlarged and also serves the function of a stopping disc to limit axial inward movement of the piston 16 by engagement with the outer end 22 of chamber 18. Stem 46 extends outwardly as a relatively narrow tube 138 suitable for dispensing fluid. Operation of the pump assembly 10 of FIGS. 8 and 9 is the same as with the pump assembly of FIGS. 1 to 7.

Body 12 is provided at the open end 22 of chamber 18 with an annular rim 140 which extends radially inwardly from the cylindrical walls of the chamber a small extent and presents an axially inwardly directed annular shoulder. This annular rim 140 serves as a stop against which sealing disc 50 abuts to limit axial outward movement of piston 16. The size of rim 140 and the relative resiliency and shape of sealing disc 50 may be selected to permit disc 50 to flex and snap inwardly past rim 140 for easy insertion and to flex and snap outwardly past rim 140 for removal under forces greater than normally to be applied in normal pumping operation of the pump.

FIGS. 8 and 9 also show a cover 142 which fits in a snap engagement onto body 12 forming an airtight annular seal thereabout. A small hole 144 is provided in the top cover 142.

In use, in accordance with a third aspect of the present invention, the reservoir or container 26 is prepared by first substantially filling the container 26 with viscous material such as soap or a hand cream or the like. The pump assembly 10 and cover 142 are then applied by threadedly coupling the pump assembly 10 to the neck 34 of the container 24. With the container 34 preferably in a vertical position and the cover 142 oriented upwardly a vacuum is applied to a hole 144 in the cover 142 to initialize the container 26 and pump assembly 10. The vacuum draws air out of the container in that both one-way valve 14 and flexing disc 48 can deflect to permit gas to pass outwardly under the vacuum. When all the air is withdrawn, the soap-like liquid comes to contact the one-way valve 14. The vacuum pressure required to draw the soap-like liquid past the one-way valve 14 is substantially greater than the pressure required to draw out gas. The vacuum pressure is selected to be a pressure which will easily draw out the gas but is insufficient to draw out the liquid.

The operation of the pump shown in FIG. 9 is as previously described, wherein a reduced pressure caused by the withdrawal of the piston 16 causes annular rim 132 to deflect away from the chamber wall and fluid to flow into chamber 18 past the annular rim 132. In the withdrawal stroke, flexing disc 48 remains substantially undeflected and assists in creating suction forces in chamber 18 to deflect the annular rim 132 and draw fluid therepast.

As is in the previous embodiment shown in FIGS. 3 to 7, the return of the piston 16 pressurizes fluid in chamber 18 between the piston and annular rim 132. This pressure urges the annular rim 132 to a closed position abutting the side walls of the chamber 18. As a result of this pressure, flexing disc 48 deflects its periphery in the manner as that shown in FIG. 7, so as to come out of sealing engagement with outer chamber wall and permit fluid to flow past disc 48 and out of chamber 18 via channel 56 and passage 52.

Advantages of such a liquid filled evacuated container include:
1. improved drop strength;
2. longer shelf life for degradable products because oxygen in the container is withdrawn;
3. the pump assembly is primed and delivers product on the first pumping of the piston;
4. air pockets are eliminated which, during later use, can enter the pump assembly and temporarily prevent flow of soap from the outlet during pumping which could make a user believe that the container is empty of soap when it is not.

The particular configuration of the pump assembly is not critical for use in gas evacuation under vacuum. The pump assembly needs to be configured merely so that when vacuum is being applied, there are one-way valve systems which permit air to be drawn out of the container at a lower vacuum pressure yet requires a substantially higher vacuum pressure to permit the soap to be drawn out past one of the one-way valves. For example, a one-way valve may be provided extending across the chamber which permits air to be drawn from the container 24 outwardly therepast under a first negative pressure, and liquid to be drawn from the container 24 outwardly therepast under a second negative pressure further below atmospheric pressure than the first negative pressure. The gas evacuation is thus preferably achieved by the vacuum providing vacuum pressure which is maintained at least as far below atmospheric pressure as the first negative pressure to draw out air but not as far below atmospheric pressure as the second negative pressure, so as not to draw out liquid.

More preferably, the one-way valve systems acts to substantially prevent air movement back into the container 24 once gas evacuation is completed. Alternately the cap 142 may be provided with a plastic or rubber sealing plug plastic or rubber sealing plug (not shown) to be fitted within and seal hole 144 after gas evacuation, thereby maintaining the lower vacuum pressure in the cap 142 until the container 24 is ready of use.

The piston 16 does not need to be in place to evacuate the air from the container.

The cover 142 is also not essential and a removable vacuum housing could be applied over the body 12 to apply the vacuum. However, it is greatly preferred that some sort of cover be provided particularly with the cover having a hole 144 through which the vacuum can be applied. While the cover 142 is shown attached to the body 12, although less preferred, a larger cover 142 could be provided attached directly to the container or reservoir 26.

Figure 10:
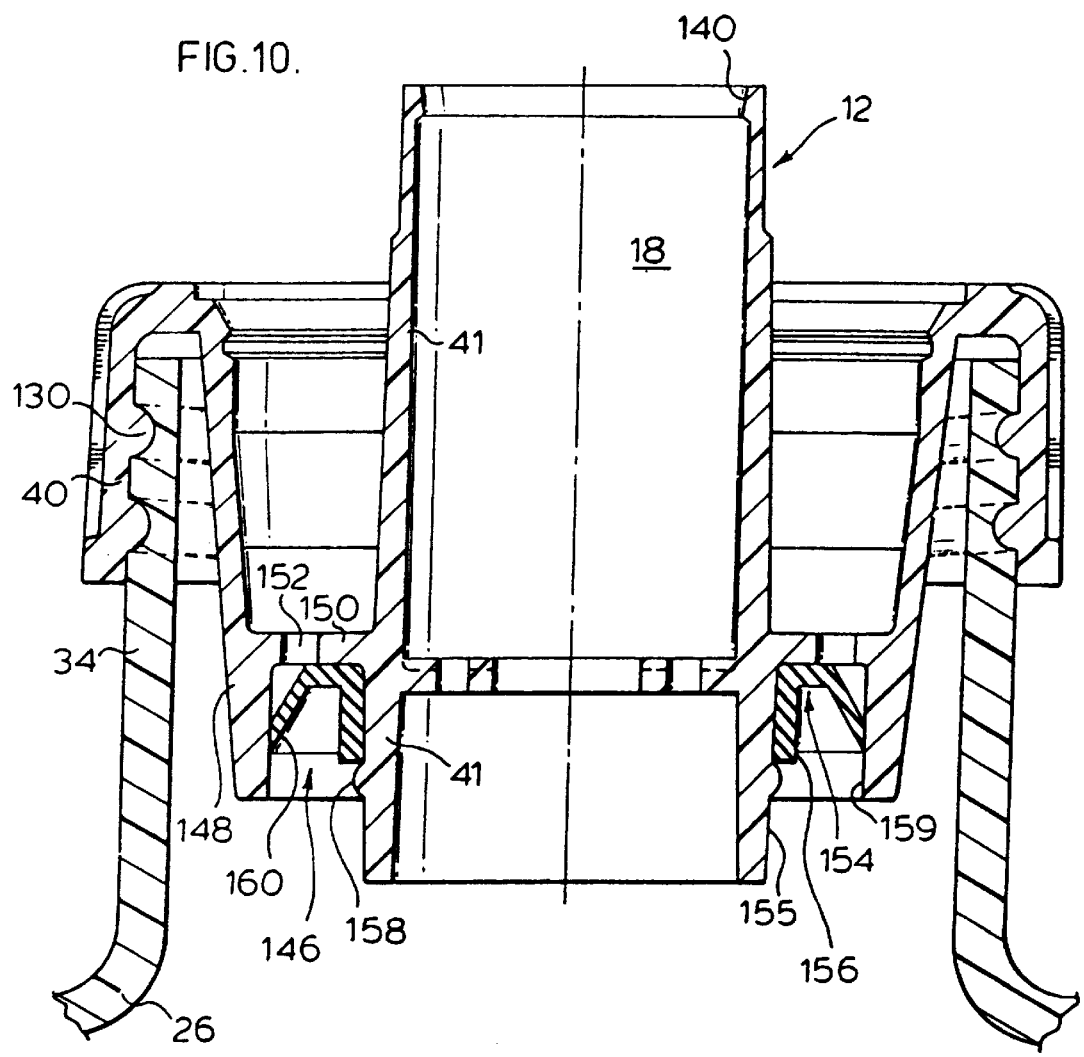
FIG. 10 is a partial cross-sectional side view of a piston-chamber forming body secured to a rigid container in accordance with a third aspect of the present invention.

Reference is now made to FIG. 10 which shows a form of the body 12 illustrated in FIGS. 8 and 9 modified to show a third aspect of the present invention. The body 12 in FIG. 10 is essentially identical to the body in FIGS. 8 and 9 with the exception that an annular groove 146 is provided between inner cylindrical portion 41 and an outer wall 148. The annular bottom 150 of groove 146 has a number of openings 152 therethrough. A resilient flexible annular seal ring 154 is provided secured in groove 146 against its inner side wall 155 by a radially inner major arm 156 of the ring engaging a shoulder on radially outwardly extending boss 158. An outer arm 160 of seal ring 156 engages the outer wall 159 of groove 146 and is adapted to flex radially inwardly to form a one-way valve. This one-way valve structure of FIG. 10 is adapted to permit use of the pump assembly 10 of FIGS. 1 or 8 with a rigid non-collapsible container 26 whose neck is only partially shown in FIG. 10. In use with the bottle inverted, on pumping soap from the non-collapsible container 26, a vacuum comes to be created in the container which would, if not decreased, prevent further pumping. The annular seal ring 154 functions by deflection of outer arm 160 to permit air to enter the container via openings 152 when a vacuum is created in the container. The seal ring 154 prevents flow of liquid out of the container via openings 152.

Figure 11:
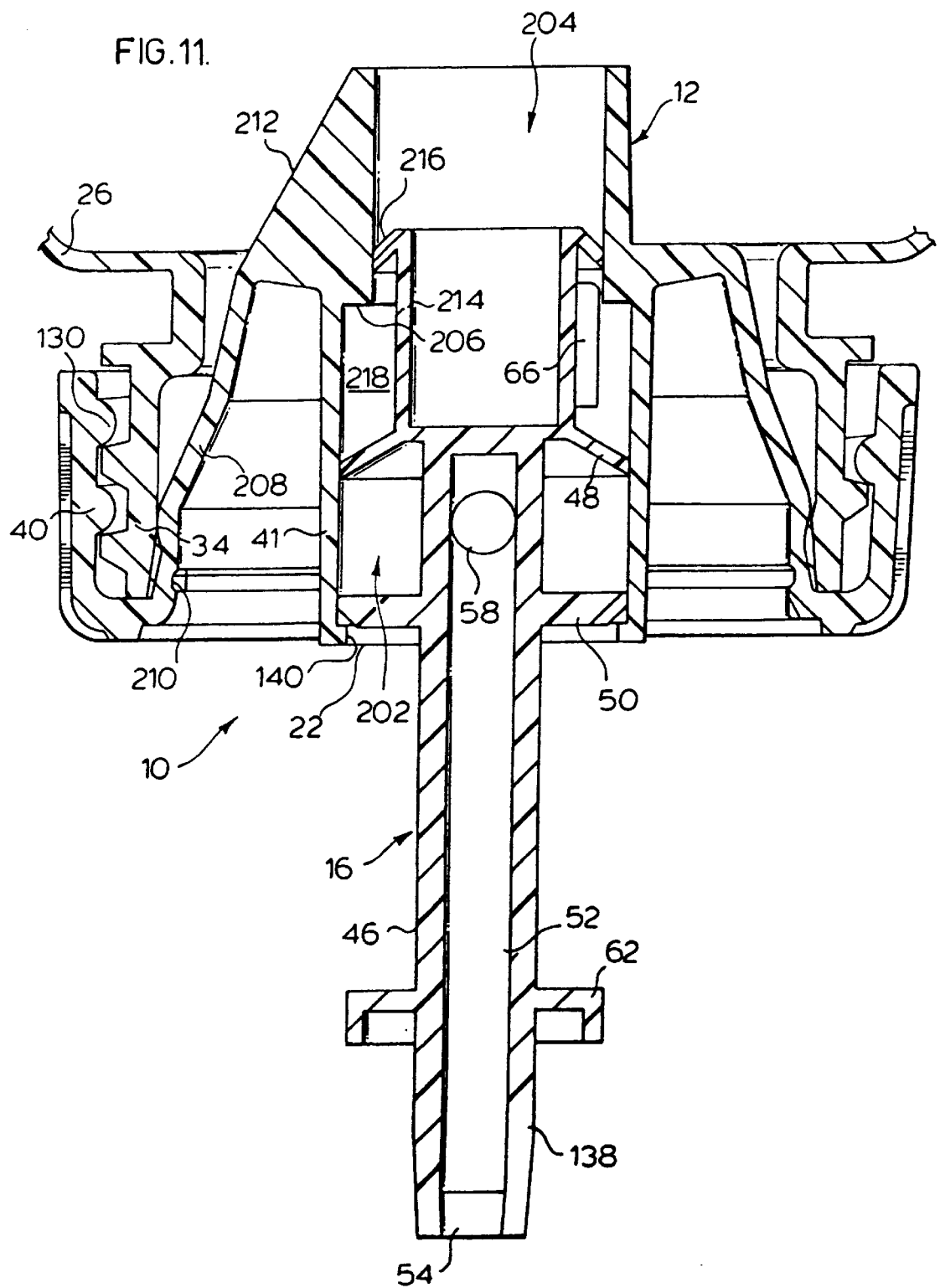
FIG. 11 is a partial cross-sectional side view of a first embodiment of a liquid dispenser in accordance with a fourth aspect of the present invention with the piston in a fully withdrawn portion.
Figure 12:
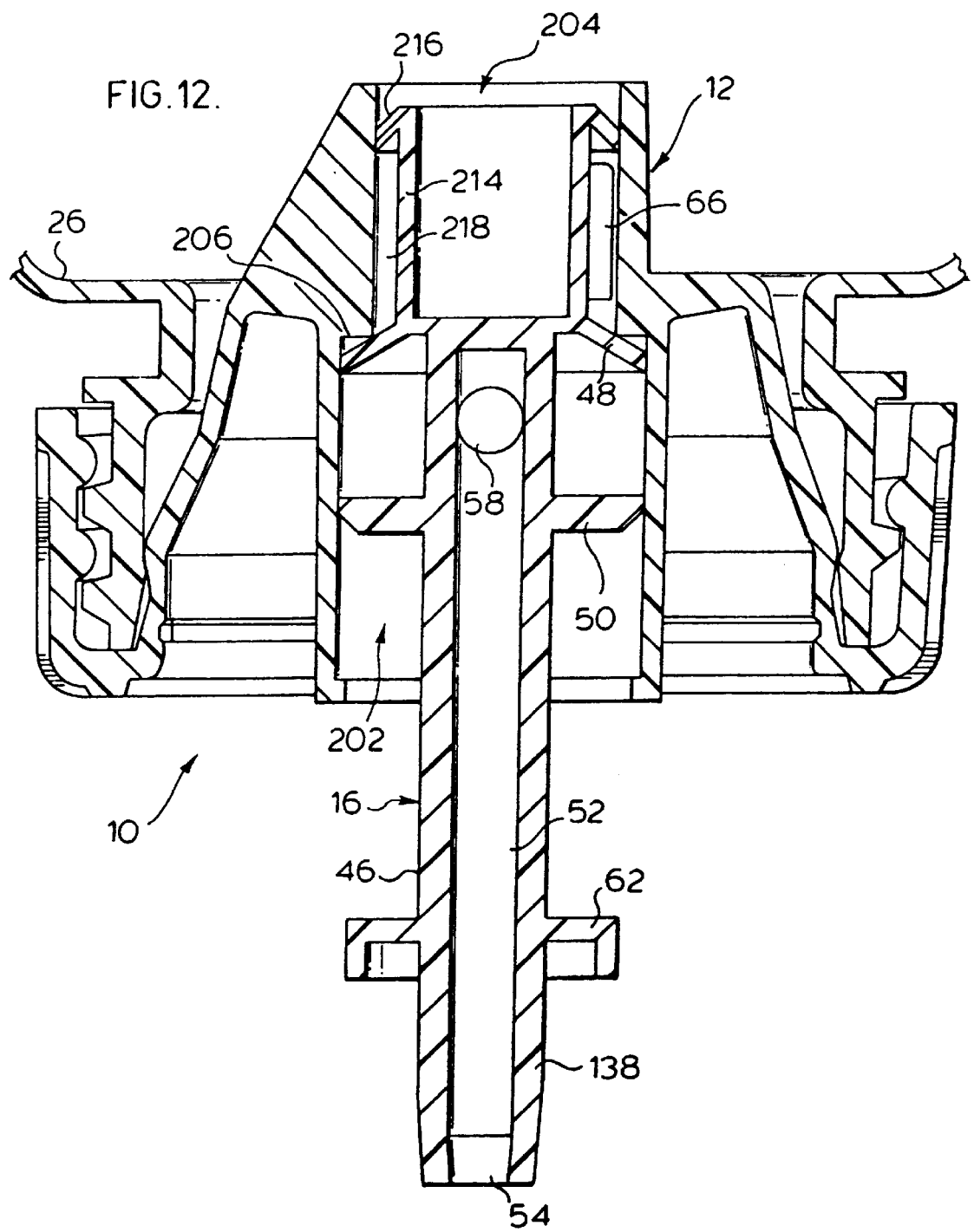
FIG. 12 is a partial cross-sectional side view of the dispenser of FIG. 11 but with the piston in a fully retracted portion.

Reference is now made to FIGS. 11 and 12 which show a first embodiment of a dispenser in accordance with a fourth aspect of the present invention. In FIGS. 11 and 12, similar reference numerals are used to refer to similar elements in FIGS. 1 to 10.

Pump assembly 10 comprises two integral elements, namely, body 12 and piston 16.

The body 12 is substantially identical to the body illustrated in FIGS. 8 and 9 with the notable exception that in FIGS. 11 and 12, the chamber 18 is a stepped cylindrical chamber having an outer cylindrical chamber 202 and an inner cylindrical chamber 204. The inner chamber 204 is of a diameter less than the diameter of the outer cylindrical chamber 202. Each chamber has cylindrical chamber wall, an inner end and an outer end. The outer chamber 202 and inner chamber 204 are coaxial in the sense of being disposed about the same central axis. The outer and inner chambers are axially adjacent each other with the outer end of the inner chamber opening into the inner end of the outer chamber. An annular shoulder 206 closes the inner end of outer chamber 202 about the outer end of the inner chamber.

Piston 16 in FIGS. 11 and 12 is virtually identical to the piston in FIGS. 8 and 9, with the exception that the piston 16 in FIGS. 11 and 12 includes an inner cylindrical extension 214 to the stem 46 carrying at its inner end an annular inner flexing disc 216. The inner extension 214 and inner flexing disc 216 are adapted to be received within the inner chamber 204. Inner flexing disc 216 is circular and extends radially outwardly from stem extension 214 with an elastically deformable edge portion engaging the chamber wall of the inner chamber circumferentially thereabout.

Piston 16 of FIGS. 11 and 12 otherwise has the same elements as piston 16 in FIGS. 8 and 9. In this regard, piston 16 of FIGS. 11 and 12 has stem 46 carrying outer flexing disc 48 and sealing disc 50. Stem 46 has its associated passage 52, inlet 58, engagement flange 62, narrow tube 138 and outlet 54.

The inner flexing disc 216 interacts with inner chamber 204 in the same manner that outer flexing disc 48 interacts with outer chamber 202. Each substantially prevents fluid flow in their respective chamber past the flexing disc in an inward direction. Each permits fluid flow in their respective chamber past the flexing disc in an outward direction by elastically deforming away from their respective chamber wall.

In FIGS. 11 and 12, the inner flexing disc 216 together with the stepped, two-diameter cylinder configuration of chamber 18, in effect, provide an inner one-way valve structure serving the function of one-way valve 14 in the pump assembly illustrated in FIGS. 1 to 9.

Operation of the pump assembly 10 is now described with reference to FIG. 11 showing piston 16 in a fully outward, withdrawn position and FIG. 12 showing piston 16 in a fully inward, retracted position, between which positions the piston 16 is reciprocated in pumping. As is known to persons skilled in the art, the volume 218 of fluid in chamber 18 between inner flexing disc 216 and outer flexing disc 48 varies with axial movement of piston 16. In FIG. 11, this volume 218 is a maximum in that the outer flexing disc 48 is axially located farthest outwardly in the larger diameter outer chamber 202. In FIG. 12, this volume 218 is a minimum in that the outer flexing disc 48 is axially located farthest inwardly in outer chamber 202.

In piston 16 moving inwardly from the withdrawn position of FIG. 11 to the retracted position of FIG. 12, the volume for the fluid between the two flexing discs decreases, placing such trapped fluid under increased pressure in that inner flexing disc 216 acts as a one-way valve to prevent flow of fluid inwardly past it in inner chamber 204. As a result of this increased pressure, outer flexing disc 48 deflects radially inwardly permitting flow of fluid outwardly past it in outer chamber 202 and, subsequently, out outlet 54 via passageway 52.

In piston 16 moving outwardly from the retracted position of FIG. 12 to the withdrawn position of FIG. 11, the volume 218 for the fluid between the two flexing discs increases, placing the fluid therebetween under reduced pressure in that outer flexing disc 48 acts as a one-way valve to prevent flow of fluid inwardly past it in outer chamber 204. As a result of this decreased pressure, inner flexing disc 216 deflects radially inwardly permitting flow of fluid outwardly past it in inner chamber 204.

In FIGS. 11 and 12, annular rim 140 is provided to engage sealing disc 50 and limit full outward movement of piston 16 in normal pumping operation. Engagement of annular shoulder 206 by outer flexing disc 48 preferably limits full inward movement of piston 16 in normal pumping operation.

As is the case with the body 12 in FIGS. 8 and 9, the body 12 in FIGS. 11 and 12 is secured to a container 26, which may be a collapsible or a non-collapsible container, by internal threads 130 on outer cylindrical portion 40 engaging the threaded neck 34 of container 26. The chambers 202 and 204 are defined inside inner cylindrical portion 41 with an annular wall 208 connecting the outer cylindrical portion 40 to the inner cylindrical portion 41. The wall 208 has circumferential grooves 210 adapted to receive a cover identical to cover 142 shown in FIGS. 8 and 9. The cross-section of body 12 shows one of a plurality of thin, radially outwardly extending reinforcing flange 212 to assist in supporting the inner chamber 204.

FIGS. 11 and 12 show one of a plurality of webs 66 provided on inner extension 214 to slidably engage the chamber wall of inner chamber 204 and assist in centering and axially aligning piston 16 in chambers 202 and 204. As is the case in the embodiments of FIGS. 1 to 10, such webs 66 are not necessary in FIGS. 11 and 12 but may advantageously be provided. The webs 66 are less necessary for the piston 66 in FIGS. 11 and 12 which has three discs, namely, sealing disc 50, outer flexing disc 48 and inner flexing disc 216. Webs 66 have been shown as axially extending radial flanges, however, many other forms of such locating members may be provided, for example, as a disc similar to disc 50 but having substantial openings therethrough or discontinuities therein.

Figure 13:
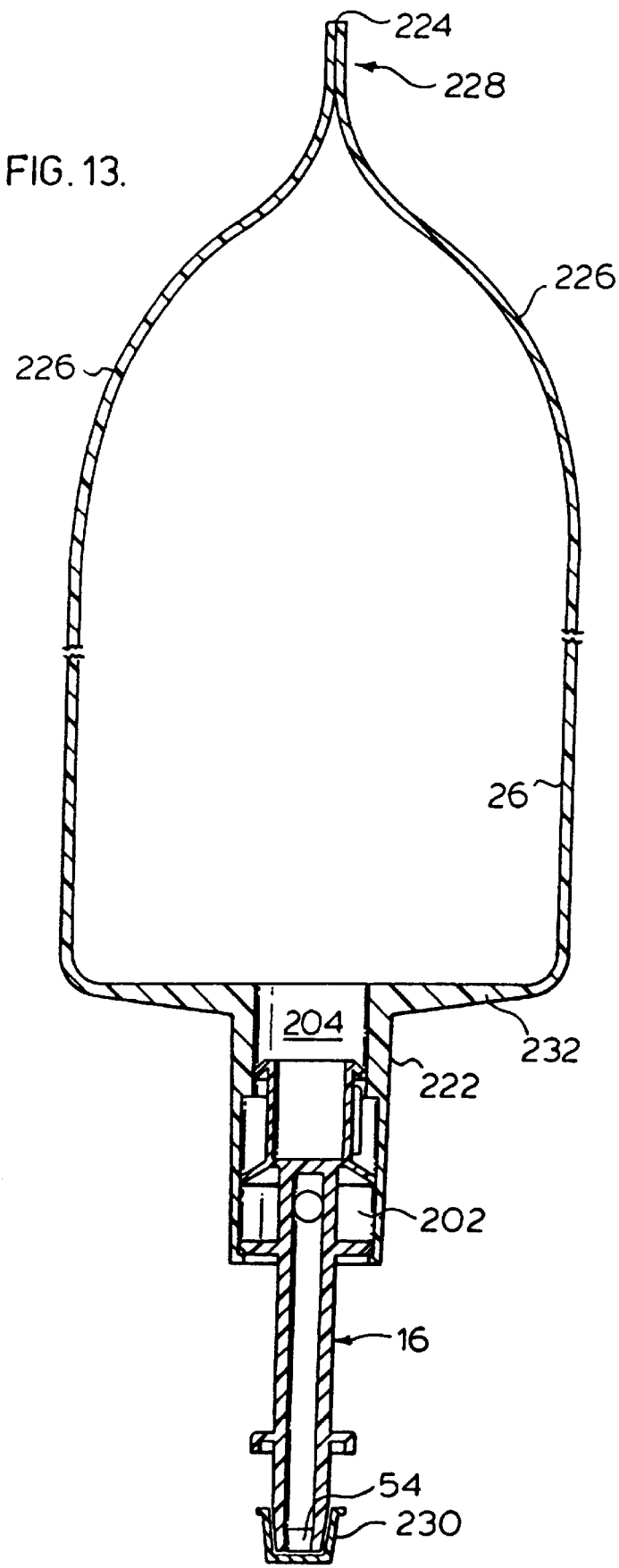
FIG. 13 is a cross-sectional side view of a second embodiment of a liquid dispenser in accordance with the fourth aspect of the present invention.

Reference is now made to FIG. 13 which shows a modified form of the pump assembly of FIGS. 11 and 12. In FIG. 13, piston 16 is identical to the piston in FIGS. 11 and 12. The container 26 in FIG. 13 is a unitary element integrally formed as one piece with the piston-chamber forming body 12. The neck 222 of container 26 has stepped interior cylindrical surfaces forming the outer chamber 202 and inner chamber 204 to otherwise be identical to that as shown in FIGS. 11 and 12. Operation of the pump in FIG. 13 is identical to that in FIGS. 11 and 12.

The pump assembly of FIG. 13 is particularly advantageous when container 26 is collapsible. In this regard, FIG. 13 is intended to illustrate a collapsible container 26 of plastic material similar to known tubes for dispensing fluids such as toothpaste. Container 26 may be formed from plastic by known extrusion, injection molding and/or blowing molding techniques to have an initially open innermost end 224. After the container 26 is filled with fluid, the side walls 226 of the container are then sealed together at seal 228 forming a straight seal extending across the container 26 completely from one side to the other to close the innermost end 224 in a known manner. In this sense, the sealed container 26 is not symmetrical about its central axis proximate end 224. A removable cap 230 is provided to close outlet 54. The unit as illustrated in FIG. 13 may be sold filled with liquid and function by itself when manually manipulated without the need for any housing, actuators or springs. A user may hold the container 26 with one hand and, with the other, slide the piston 16 inwardly and outwardly to dispense fluid as required.

Container 26 is shown with its neck 222 and a circular dispensing flange 232 of increased thickness to provide relative rigidity and strength compared to the relatively thin collapsible side walls 226.

Figure 14:
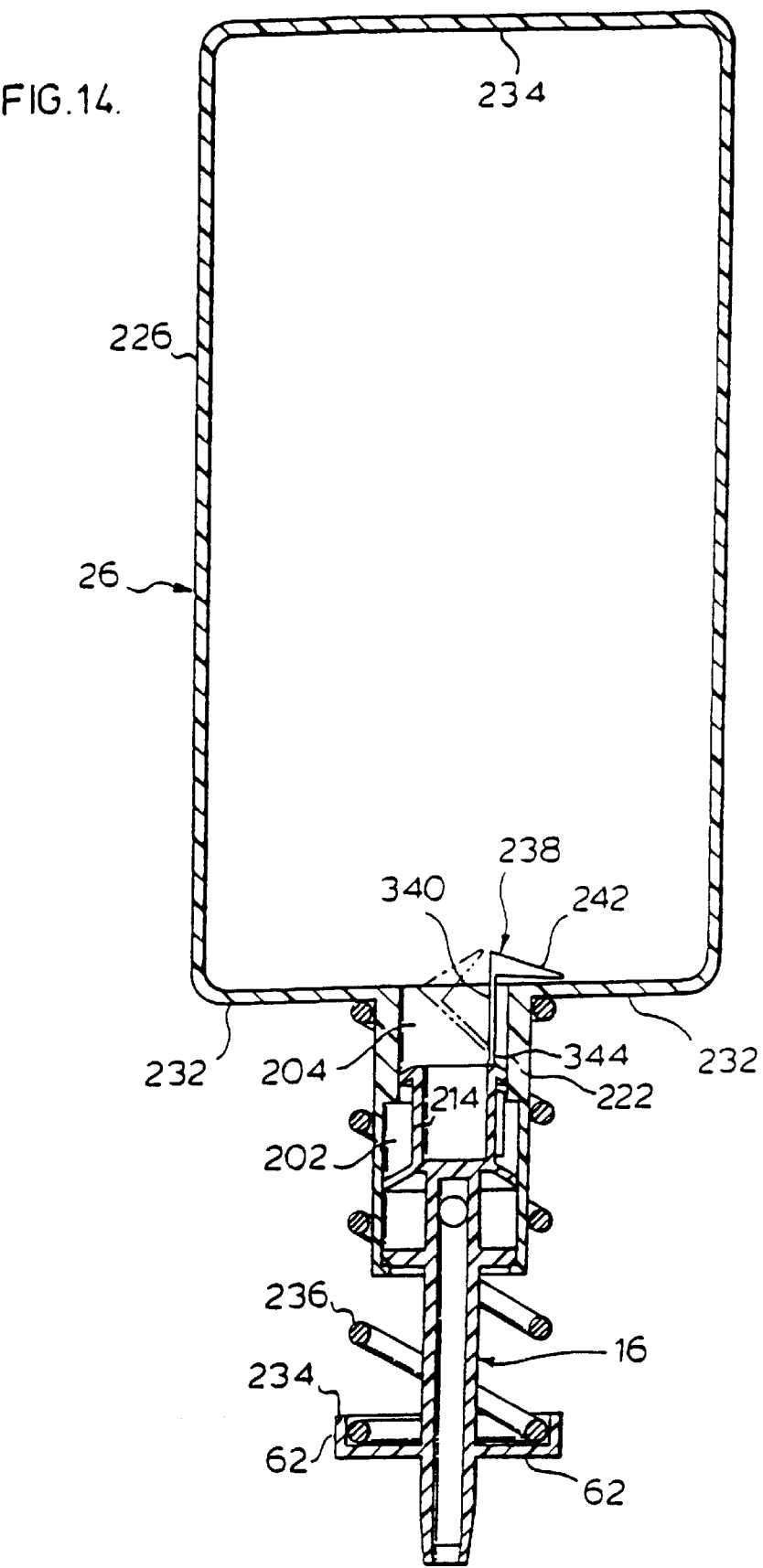
FIG. 14 is a cross-sectional side view of a third embodiment of a liquid dispenser in acordance with the fourth aspect of the present invention.

Reference is now made to FIG. 14 which shows a modified form of the pump assembly of FIGS. 11 and 12 and most similar to the assembly of FIG. 13. In FIG. 14, container 26 is substantially the same as that in FIG. 13 with the piston chamber forming body integral with the container. The container 26 is preferably a cylindrical container having cylindrical side walls 226 and a circular end wall 234. Container 26 in FIG. 14 is most preferably a collapsible, flexible container formed by an injection blow molding process or possibly a stretch blow molding process. Such process would allow for accurate forming of the chambers 202 and 204 in the neck yet permit the sidewalls 226 to be as thin as possible to readily collapse. Alternately, container 26 could have relatively rigid walls, with the container formed from glass or with thicker plastic sidewalls. When container 26 is rigid, then a one-way valve typically would be required (not shown) to prevent a vacuum from becoming created in the container which could prevent pumping of fluid from the container.

In either event, with either a collapsible or more rigid, non-collapsible container 26, the container 26 of FIG. 14 would be filled through its neck 222 first and thereafter the piston 16 inserted. If the container is collapsible then preferably after applying the piston, gas in the container may be removed by a vacuum in a manner and analogous to that described in association with FIGS. 8 and 9. A suitable cover may also be provided.

Piston 16 is identical to the piston in FIGS. 11 and 12 with the exception that engagement flange 62 is enlarged to have a greater radial extent and to have annular side flange 234 assist in retaining helical spring 236 between engagement flange 62 and the depending flange 232 about container neck 222. Such spring 236 biases the piston 16 to the fully withdrawn position. The spring may be formed of metal, although preferably, is a resilient nylon or plastic spring which may be ground and recycled.

While FIG. 14 is shown with a spring 236 and modified engagement flange 62 to accommodate the spring, this is but one alternate configuration. The preferred use of the device of FIG. 14 could be without the spring 236 as in a dispenser similar to that illustrated in FIG. 1. The container 26 would preferably be secured in a housing with a spring biased actuator to engage the engagement means and provide for reciprocal movement of the piston in use.

Various different systems may be used to secure the container in the housing. One preferred system is to have an annular groove in the neck of the container 26 such as shown as 300 in FIG. 12. With such an annular groove, the container 26 carrying its pump may be slid laterally into a housing carrying a horizontal plate such as illustrated as 302 in FIG. 12 which has a slot equal to the inner diameter of groove 302 so as to be engaged in the groove and support the container 26 against vertical movement. Similar grooves or slots could be provided on neck 222 of container 26 in FIG. 14 to assist in locating and retaining it within a dispenser, wherein actuator means may move piston 1 inwardly and outwardly to dispense fluid is desired.

Figure 15:
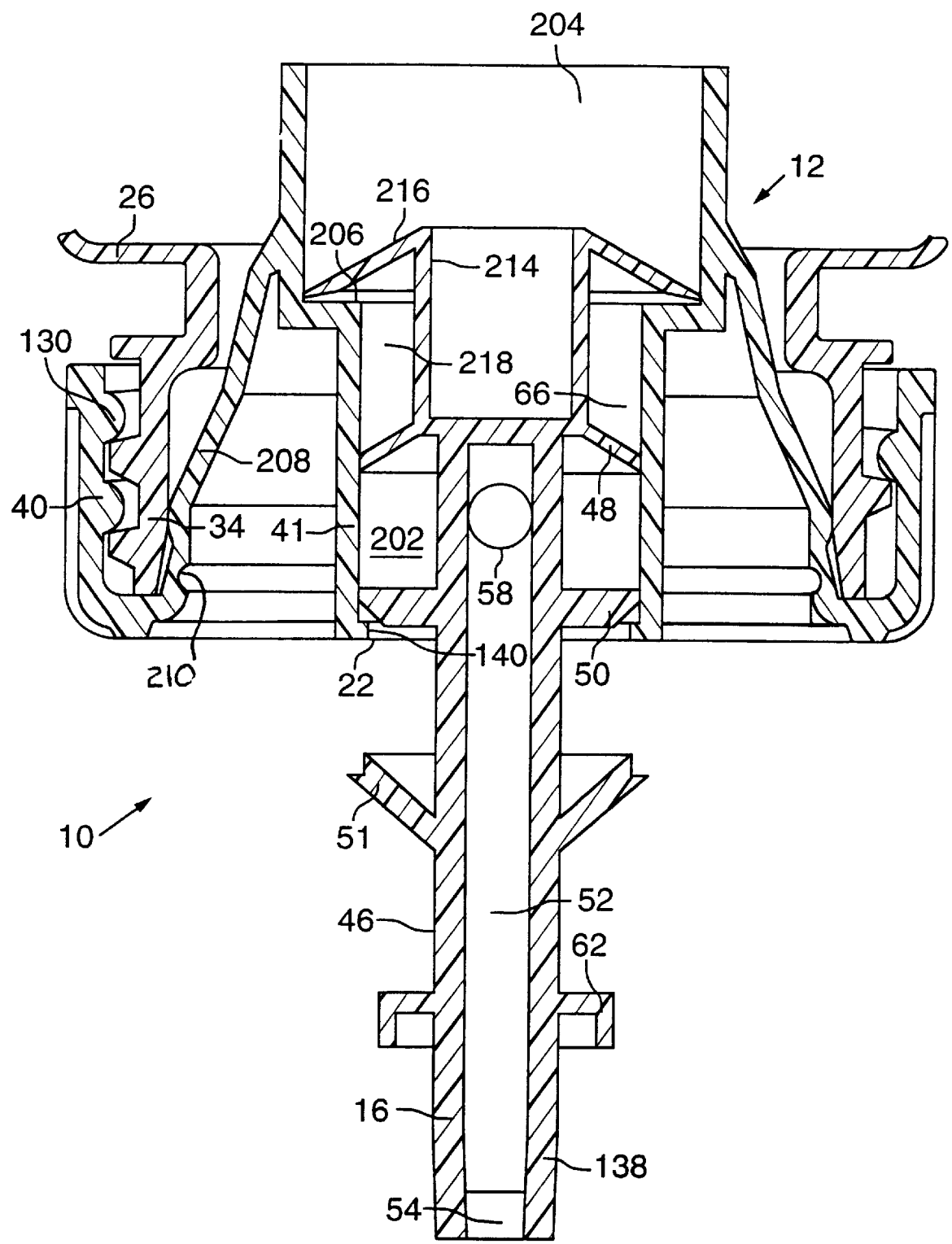
FIG. 15 is a partial cross-sectional side view of a second embodiment of a liquid dispenser in accordance with the fourth aspect of the present invention with the position in a fully withdrawn portion.
Figure 16:
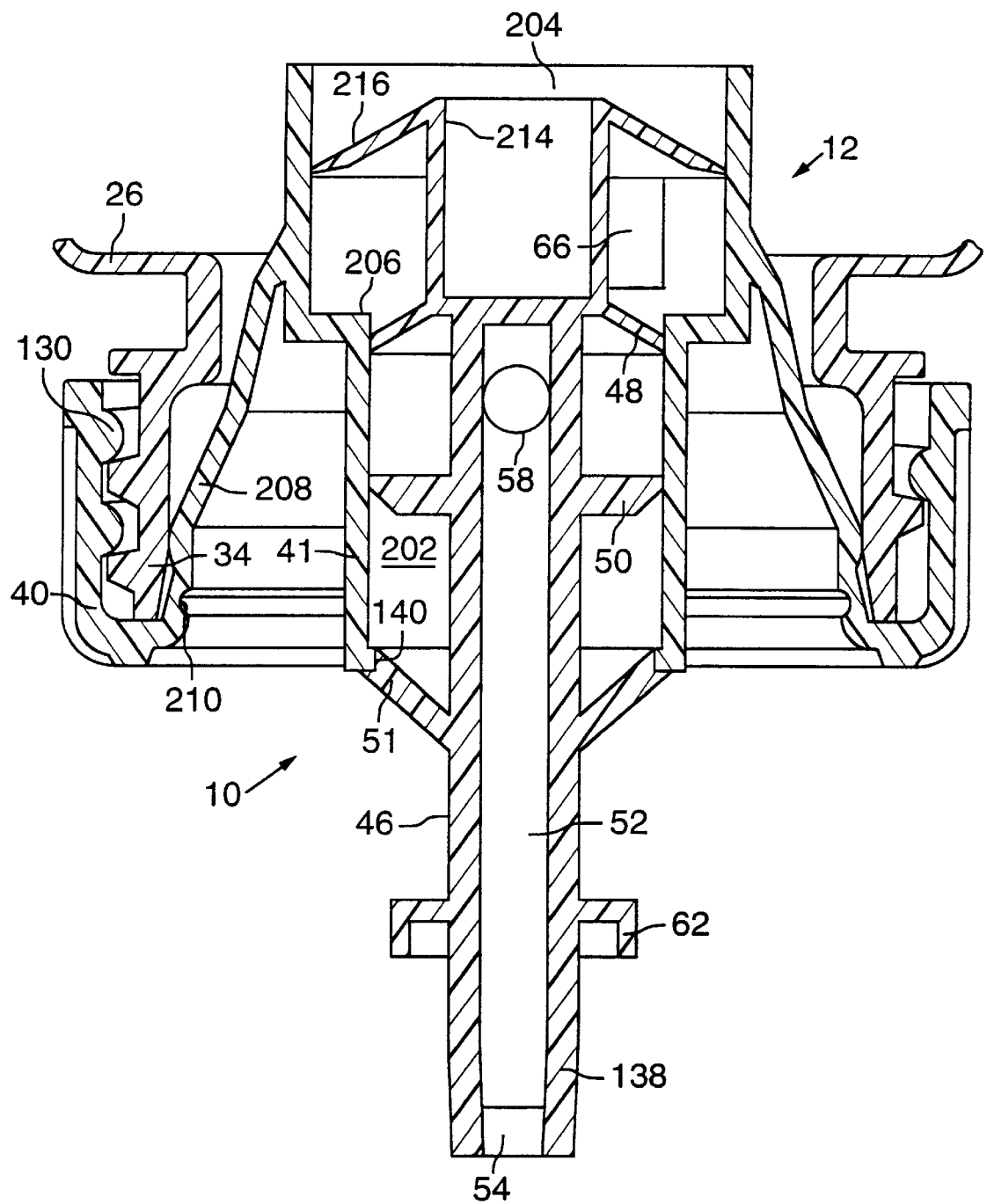
FIG. 16 is a partial cross-sectional side view of the dispenser of FIG. 15 but with the piston in a fully retracted position.

Reference is made to FIGS. 15 and 16 which show a second embodiment of a dispenser in accordance with the fourth aspect of the present invention. In FIGS. 15 and 16, the same reference numerals are used to refer to similar elements as in FIGS. 11 and 12.

The embodiment of FIGS. 15 and 16 is essentially identical to that shown in FIGS. 11 and 12 with the exception that the inner chamber 204 is of a diameter greater than the diameter of the outer cylindrical chamber 202. Thus, in both embodiments, the piston-chamber forming body 2 provides a stepped cylindrical chamber having an outer cylindrical chamber 202 and an inner cylindrical chamber 204 with the diameter of the outer chamber 202 being different than the diameter of the inner cylindrical chamber 204. Whereas in the embodiment of FIGS. 11 and 12, the piston 16 is insertable into the chambers from outside, i.e. below as seen in FIGS. 11 and 12, in the embodiment of FIGS. 15 and 16, the piston 16 is insertable into the chambers from above as seen in FIGS. 15 and 16. To accommodate insertion of the piston 16 in this manner in FIGS. 15 and 16, the engagement flange 62 is shown of a diameter less than the diameter of the open end 22 of the outer chamber 202. In FIGS. 15 and 16, withdrawal of the piston 16 from the chambers in a downward, outward direction is prevented by inner flexing disc 216 engaging annular shoulder 206.

In the device of FIGS. 15 and 16, it is preferred but not necessary that a mechanism be provided to prevent withdrawal of the piston 16 from the chambers in normal use in movement in an upward, inward direction. In FIGS. 15 and 16, a stop flange 51 has been provided on piston 16 which will engage the open end 22 of the outer chamber 202 to stop further upward, inward movement. Stop flange 51 is sufficiently flexible that it will, on insertion, flex inwardly to pass through open end 22 on downward movement on initial insertion. Many other configurations of stop devices may be utilized.

The operation of the pump assembly of FIGS. 15 and 16 is the same as with the pump of FIGS. 11 and 12 with the exception that in the pump of FIGS. 15 and 16, fluid is drawn out of the container and into the chambers in the inward return stroke of the piston 16, that is, on moving from the position of FIG. 15 to that of FIG. 16, and fluid is discharged from the chambers in the outward withdrawal stroke of the piston 16, that is, on moving from the position of FIG. 16 to that of FIG. 15. With both the embodiments of FIGS. 11 and 12 and of FIGS. 15 and 16, cycling of the piston 16 results in withdrawal of fluid from the container and pumping of fluid out of the outlet 54 due to the inner chamber 204 and outer chamber 202 having different diameters.

In the context of FIG. 15, on the piston 16 moving inwardly (upwardly as shown), fluid will flow past inner flexing disc 216 to between inner flexing disc 216 and outer flexing disc 48. In the context of FIG. 16, on the piston 16 moving outwardly (downwardly as shown), fluid will be forced from between discs 216 and 48 outwardly past outer flexing disc 48 to exit via inlets 58 and passage 52.

Figure 17:
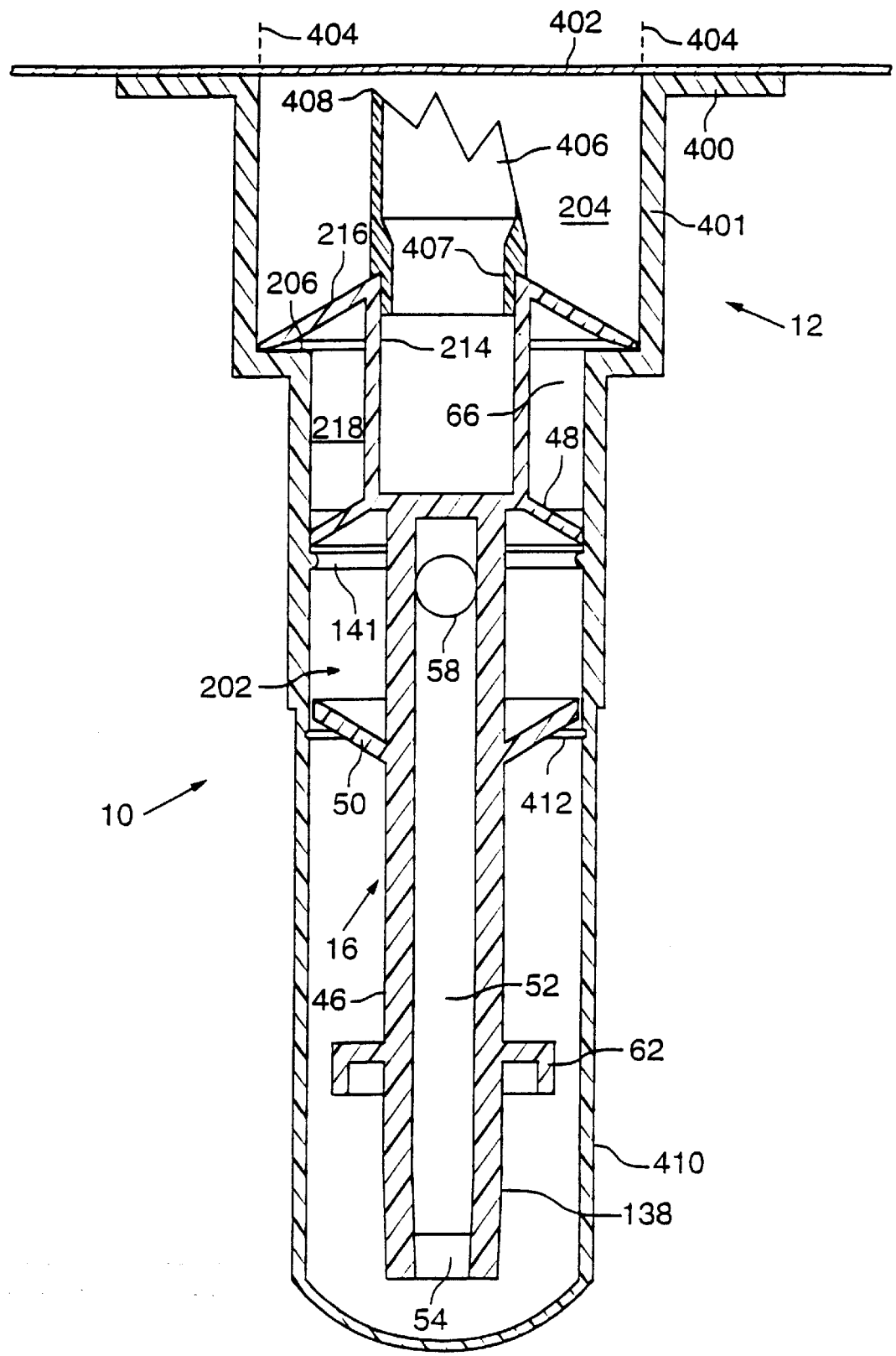
FIG. 17 is a partial cross-sectional side view of a third embodiment of a liquid dispenser in accordance with the fourth aspect of the present invention with the piston in a fully withdrawn position.

Reference is now made to FIG. 17 which shows a pump assembly having a chamber and piston similar to that of FIGS. 15 and 16 and having some additional features.

Firstly, in FIGS. 15 and 16, the chamber forming body 12 is part of a structure adapted to be screwed onto the top of a threaded opening to a container. In contrast in FIG. 17, the chamber forming body 12 is adapted by reason of radial flange 400 to be secured as by heat welding to a thin wall 402, preferably of plastic, for a container such as a plastic bag. This flange 400 is carried on the inner end of the side wall 401 forming inner chamber 204.

Wall 402 may be provided with an opening coincident with the innermost end of inner chamber 204 as indicated by dotted lines 404. As shown, however, the wall 402 preferably, sealably encloses the innermost end of inner chamber 204 and, in effect, comprises a thin, cuttable or fragible membrane. To cut an opening through the wall 402 or, otherwise, rupture the wall, at the time of first use of the pump assembly 10, the piston 16 is provided rearward of the inner flexing disc 216 with a cutting member 406.

The cutting member 406 is shown as formed as a separate plastic element which is adapted to securely engage on the innermost end of the piston 16 as by an outer cylindrical portion 407 of the cutting member being received in a friction fit inside the cylindrical innermost end of the piston 16. The cutting member 406 has sharp spikes 408 which, when the piston 16 is initially moved inwardly, will engage and cut through wall 402 to permit fluid to be pumped from the container. The cutting member is shown as a separate element to the piston 16 as this can be advantageous to provide the cutting member of a material which will have sufficiently sharp and rigid spikes to cut through wall 402. For example, the piston 16 may preferably comprise a more flexible plastic to assist in forming seals with the chambers as, for example, of low density polyethylene whereas the cutting member may comprise a stiffer, more brittle plastic as, for example, a high density polyethylene. The cutting member could, however, be formed as an integral element to the piston 16 and of the same material.

Secondly, in FIG. 17, the chamber forming body 12 is provided with a cap 410 which extends from the outer end of the outer chamber 202 to totally enclose the stem 46 of the piston 16. This cap 410 is shown with an annular groove 412 about its side wall 412 to provide a weakened portion to the side wall such that the cap 410, while sealably closing the outer chamber 202, is fragible and may be broken off for use and engagement of the piston. FIG. 17, thus, illustrates a unitary plastic element comprising the chamber forming body 12 which can be applied in a sealed relation to a container to retain the piston 16 therein, preferably, in a sealed condition against contamination.

While cap 410 is shown as integral to the chamber forming body 12 and fragible, it is to be appreciated that the cap may be provided as a separate removable element, similar to that shown in FIGS. 8 and 9, for example.

The pump assembly, with a bag as shown in FIG. 17, is useful for fluids of all kinds, but is especially useful where a sealed or sterile condition is required, such as for food products like ketchup, mustard, milk and the like, and medicines and other products such as soap and the like whose life reduces on exposure to air.

Thirdly, in FIG. 17, the sealing disc 50 is shown to have a preferred configuration. In all embodiments, the sealing disc 50 serves to prevent fluid flow in the outer chamber past the sealing disc 50 in an outward direction. That is, the sealing disc 50 serves to close the outermost end of outer chamber 202 such that fluid directed into the outer chamber 202 past flexing disc 48 will flow out inlets 58 and passage 52 which is typically open to the atmosphere. In FIG. 17, sealing disc 50 has a configuration substantially the same as that of flexing disc 48, however, with the sealing disc 50 comprising a conical flange on the piston 16 which extends inwardly. Since inlets 58 and passage 52 vent the space between sealing disc 50 and flexing disc 48 to atmosphere, there are no practical problems caused insofar as pressure differentials will not arise across sealing disc 50 which would tend to let air pass inwardly past sealing disc 50.

Providing sealing disc 50 with a conical, more flexible configuration is advantageous to facilitate manufacture with lower tolerances to be required for a proper seal between the outer chamber and the sealing disc 50 due to the increased flexibility of sealing disc 50.

Fourthly, in FIG. 17, a different mechanism is provided to stop movement of the piston in an inward, upward direction. Whereas in FIGS. 15 and 16, inward movement was stopped by stop flange 51, in FIG. 17, a radially extending annular shoulder-forming flange 141 is provided on the side wall 41 of the outer chamber 202 which is to be engaged by sealing disc 50 to stop inward movement of the piston under normal operating conditions. Shoulder-forming flange 141 is sized such that the stop flange 51 may flex to pass therepast on initial insertion of the piston 16 into the chambers.

The embodiment of FIG. 17 could be modified to provide an opening through wall 402 and to eliminate cutting member 406. With such a device, if an internal pressure is provided inside the container, such pressure will urge the piston 16 outwardly, thus urging the sealing disc 216 into a positive seal with shoulder 206. This may be advantageous if a container is to be filled through another opening and subjected to pressures under filling conditions with the pump assembly attached. Additionally, if a positive pressure is maintained inside the container, the pump will reciprocate without the need for a spring. For example, manually applied forces may be used to move the piston 16 of FIG. 17 inwardly (upwardly) against the pressure in the container, and the pressure in the container will urge the piston outwardly in a return stroke to the sealed relation shown in FIG. 17.

Figure 18:
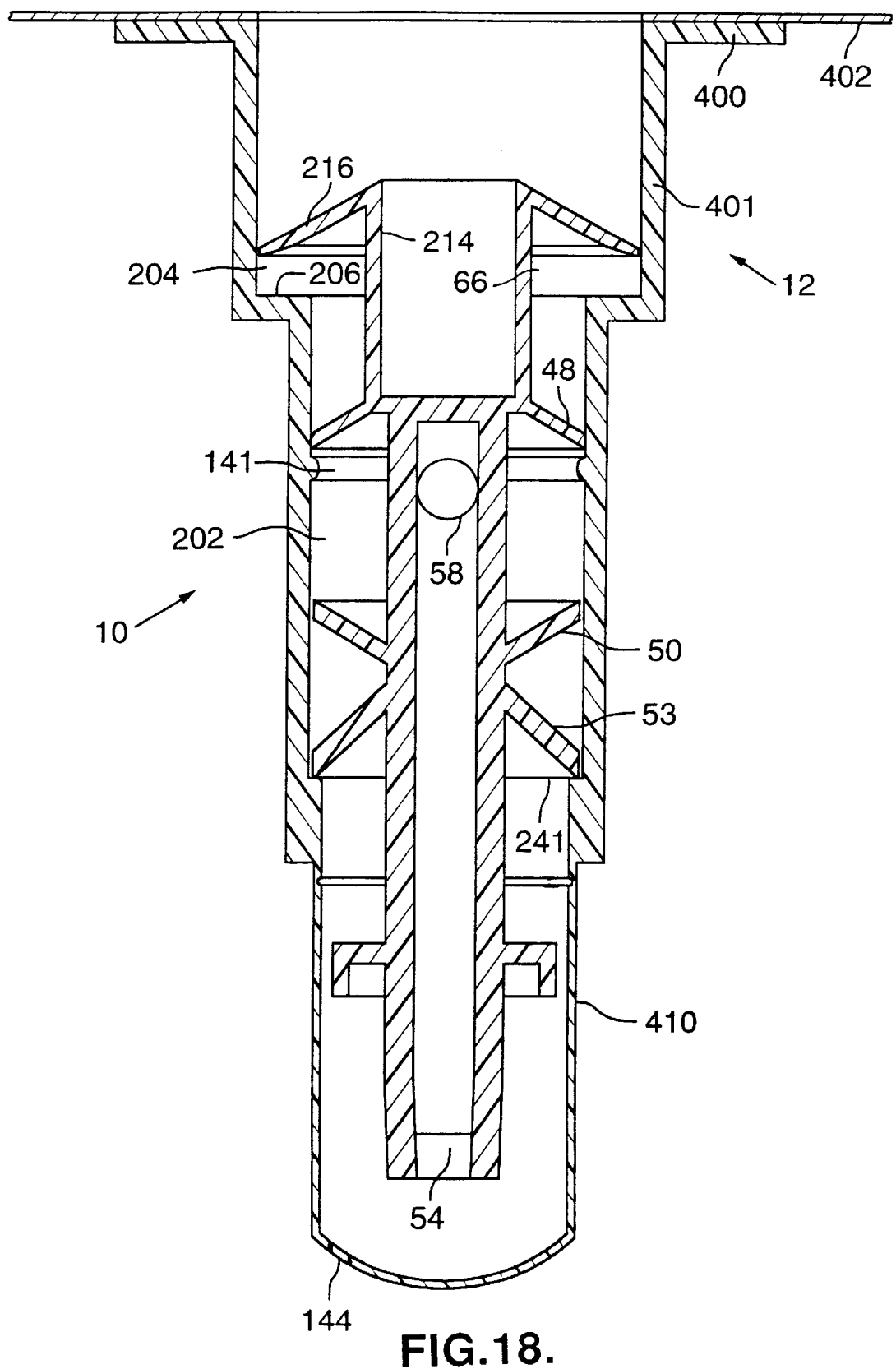
FIG. 18 is a partial cross-sectional side view of a fourth embodiment of a liquid dispenser in accordance with the fourth aspect of the present invention with the piston in a fully withdrawn portion.
Figure 19:
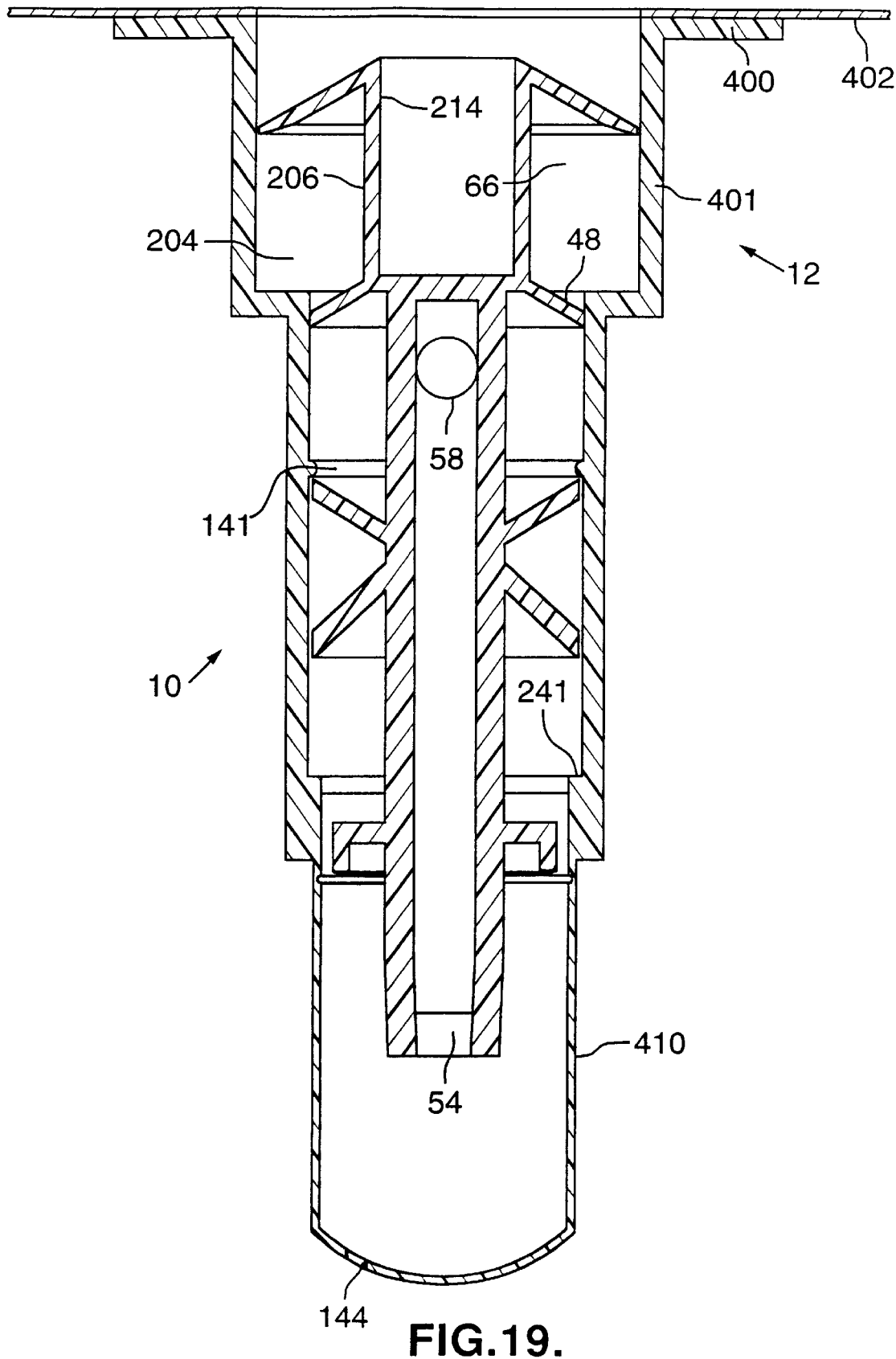
FIG. 19 is a partial cross-sectional side view of the dispenser of FIG. 18 but with the piston in a fully retracted position.

Reference is made to FIGS. 18 and 19 showing a fourth embodiment of a dispenser in accordance with the fourth aspect of the present invention. In FIGS. 18 and 19, the same reference numerals are used to refer to similar elements as in the other figures. FIGS. 18 and 19 are of the same pump assembly. FIG. 18 shows a fully withdrawn position. FIG. 19 shows a fully retracted position.

The embodiment of FIGS. 18 and 19 is similar to that in FIG. 17. One notable difference is that a stopping disc 53 has been provided on the piston 16 cooperating with shoulder 241 on outer chamber to limit outward (downward) movement of the piston at a preferred location as shown in FIG. 18 such that sealing disc 216 is not sealably engaged on shoulder 206. In this position of FIG. 18 and in that an opening 144 is provided in cap 140, by applying a suitable vacuum to opening 144, gas or fluid may be drawn from the container past both flexible discs 216 and 48 and out inlets 58 and nozzle 54 to opening 144 as in a similar manner discussed with reference to FIGS. 8 and 9.

Flange 141 is, preferably, gently sloped on its inner surface to assist stop flange 53 to forceably move therepast on initial insertion. Flange 141 is sufficiently axially spaced from flexing disc 48 to permit the flexing disc to let gas/fluid to pass therepast.

FIG. 19, which is identical to FIG. 18 but shows the piston in a fully retracted position, shows inward movement limited by sealing disc 50 engaging shoulder-forming flange 141. It is to be appreciated that sealing disc 50 and stopping disc 53 each can serve sealing and stopping functions.

Opening 144 need not be provided in cap 410 if it is preferred to keep the piston in a sealed and/or sterile condition. A removable closure plug may be provided for opening 144 if desired or, alternatively, a one way valve could be provided across opening 144.

Figure 20:
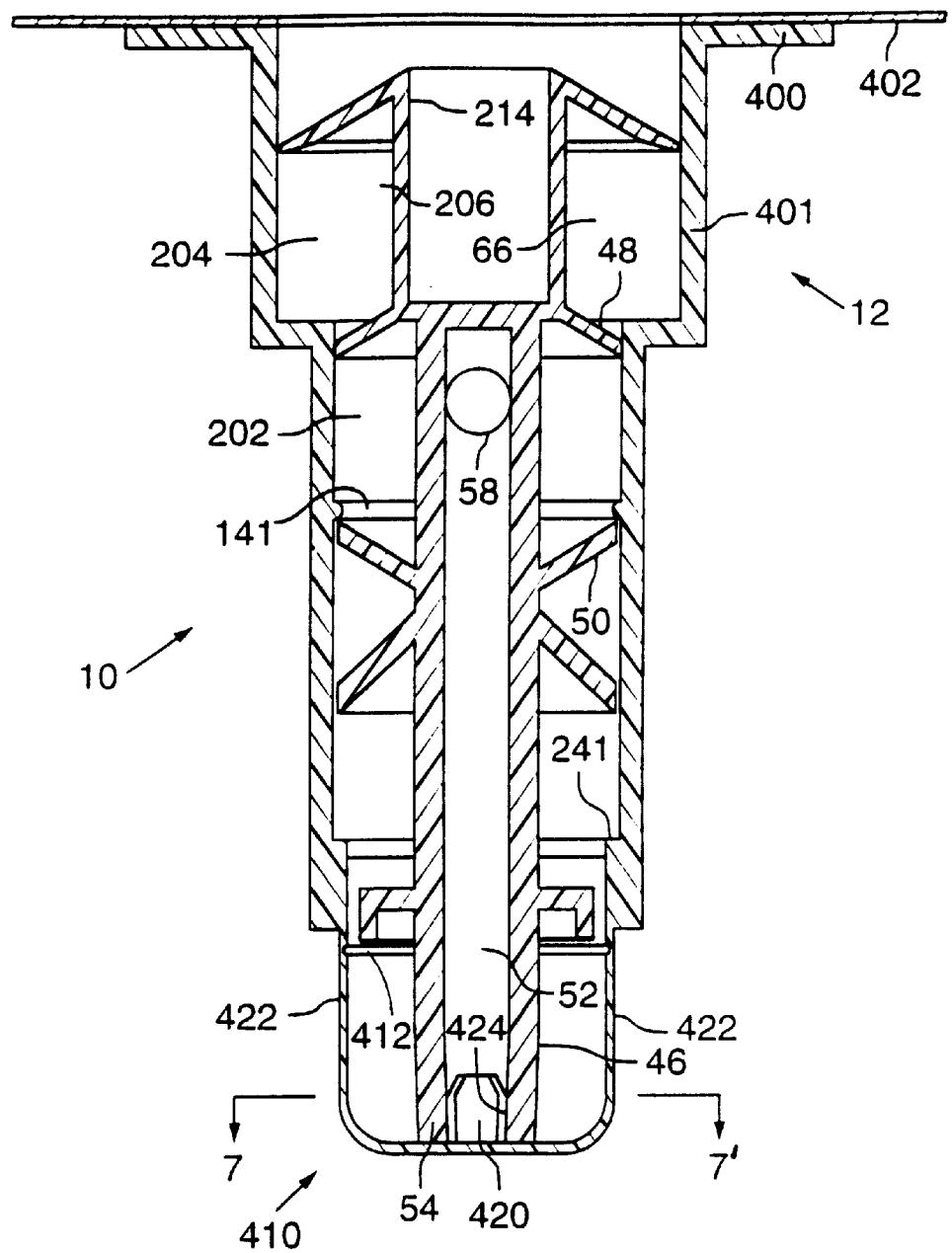
FIG. 20 is a partial cross-sectional side view of a fifth embodiment of a liquid dispenser in accordance with the present invention with the piston in a fully retracted position and a closure cap in place.
Figure 21:
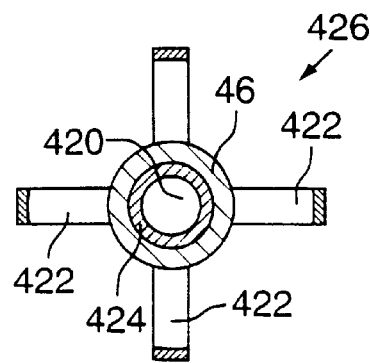
FIG. 21 is a cross-sectional view of FIG. 20 along section line 7-7'.

Reference is made to FIGS. 20 and 21. The pump of FIG. 20 is identical to that shown in FIGS. 18 and 19 but for the provision of a modified cap 410 which carries a plug 420 to be received in the outlet 54 and seal the outlet.

As seen in FIG. 21, the cap 410, rather than totally enclose the outer end of the outer chamber 202, has its side walls substantially removed outward of groove 412 such that a number of arms 422, four as shown, extend downwardly from groove 412 as shown to support the plug 420 centrally thereon. Each arm 422 is preferably formed integrally with the body 12. Having but a number of arms 422 renders manufacture of the body 12 easier as by injection molding, preferably as an integral part of body 12 and renders the cap 410 easier to break off for use since merely the arms 422 need to be broken at the groove 412 rather than the entire circumference of the cap 410 as was the case with the caps of FIGS. 17 to 19.

Plug 420 is shown to have a generally cylindrical wall 424 sized to be received within the passageway 52 in sealing relation.

While not necessary, the cap 410 is preferably sized such that the outlet 54 is seated and sealed by the plug 420 when the piston 16 is in the fully withdrawn position as with sealing disc 50 engaged on the outward side of flange 144. This prevents any movement of piston 16 until the cap 410 is removed.

While FIG. 21 shows the cap 410 as having openings 426 between its arms 422, such openings are not necessary and the cap 410 could comprise a cap 410 which encloses the open outer end of the outer chamber as in the manner of the cap 410 in FIGS. 17 to 19 but with a plug 420 provided on the cap.

The cap 410 is preferably integrally formed with body 12, however, this is not necessary and a removable cap which may be secured to the body 12 as in the manner shown in FIG. 9, could be provided with a plug such as plug 420 in FIGS. 20 and 21 and with or without openings 426.

A cap with a plug similar to that shown in FIG. 20 and with or without openings 426 may be provided for sealing and/or enclosing the outer open ends of pumps having configurations other than configurations with an inner chamber having a diameter greater than that of the diameter of the outer chamber. Such a cap with a plug may readily be utilized in pumps having a stepped chamber with an inner chamber having a diameter greater than that of the diameter of the outer chamber and with other pumps having a nozzle which extends or is accessible from an opening of the piston receiving chamber. The cap may be formed integrally with the chamber forming body of such pumps or be manufactured as a separate element. When manufactured as a separate element to assist in rendering the cap tamper-proof, the cap may be welded, bonded or otherwise glued onto the body such that removal requires visibly breaking fragible portions or separate safety bands or the like. Preferably, the cap and plug engage the piston so as to prevent the piston from movement having regard to the configuration of the chamber forming body until the cap is removed.

Preferably, not only the pump 10 but also the reservoir 26 may be made entirely of recyclable plastic material which may easily be recycled without the need for disassembly prior to cutting and shredding.

While FIG. 17 shows the cutting member 406 as preferably provided in an embodiment where the inner chamber 204 has a diameter larger than that of the outer chamber 206, it is to be appreciated that a similar cutting member 406, as in the cannula form shown, could be provided on the innermost end of the piston 16 as shown in FIGS. 11 and 12 where the inner chamber has the lesser diameter.

Although the disclosure describes and illustrates a preferred embodiment of the invention, it is to be understood that the invention is not limited to these particular embodiments. Many variations and modifications will now occur to those skilled in the art.

I claim:

1. A fluid pump comprising a piston chamber forming member having an inner end and an outer end, the inner end to be placed in fluid communication with a source of fluid, a piston forming element received in the piston chamber forming member axially slidable inwardly and outwardly therein, the piston forming element having an axially extending hollow stem which extends out of said outer end of the piston chamber forming member, the stem having a central passageway ending at an outlet, the piston forming element cooperating with the piston chamber forming member whereby inward and outward reciprocal sliding of the piston forming element in the piston chamber forming member pumps fluid from the inner end through the piston chamber forming member by passing through the passageway in the stem and out the outlet, a plug member removably received in the outlet to sealably close the passageway, the plug member is removably secured to the piston chamber forming member.

2. A pump as claimed in claim 1 wherein the plug member comprises a portion of a removable cover secured to the piston chamber-forming member.

3. A pump as claimed in claim 2 wherein the cover comprises an integral part of the piston chamber forming member and is removable by breaking a fragible junction joining the cover thereto.

4. A pump as claimed in claim 3 wherein the cover comprises a plurality of arm members disposed at different circumferentially spaced locations about the outer end of the piston chamber forming member relative the piston forming element and supporting the plug member axially aligned with the outlet with openings through the cover between the arm members.

5. A pump as claimed in claim 2 wherein the cover comprises a plurality of arm members disposed at different circumferentially spaced locations about the piston chamber forming member relative the piston forming element and supporting the plug member axially aligned with the outlet with openings through the cover between the arm members.

6. A pump as claimed in claim 2 wherein the piston chamber forming member including the cover is formed as an integral member by injection molding.

7. A pump as claimed in claim 2 wherein the cover substantially seals the outer end of the piston chamber forming member.

8. A pump as claimed in claim 2 wherein a cutting element is carried on the piston forming element and extending axially inwardly towards the inner end of the piston chamber forming member, the piston forming element located in the piston chamber forming member in an initial position with the cutting element in the piston chamber forming member spaced from a membrane towards the outer end such that on axial sliding of the piston forming element towards the membrane, the cutting element engages the membrane and breaks the membrane, the cover substantially prevents access to the piston-forming element.

9. A pump as claimed in claim 1 wherein the plug member limits sliding of the piston-forming element outwardly relative the piston chamber-forming member.

10. A fluid pump comprising a piston chamber forming member having an inner end and an outer end, the inner end closed by a fragible membrane which, when unbroken, separates the inner end from fluid communication with a source of fluid and, when broken, places the inner end in fluid communication with the source of fluid, a piston forming element received in the piston chamber forming member axially slidable inwardly and outwardly whereby inward and outward reciprocal sliding of the piston forming element in the piston chamber forming member pumps fluid through the piston chamber forming member from the inner end to out the outer end, a cutting element carried on the piston forming element and extending axially inwardly towards the inner end of the piston chamber forming member, the piston forming element located in the piston chamber forming member in an initial position with the cutting element in the piston chamber forming member spaced from the membrane towards the outer end such that on axial sliding of the piston forming element towards the membrane, the cutting element engages the membrane and breaks the membrane.

11. A pump as claimed in claim 10 including a removable cover member substantially sealing the outer end of the piston chamber forming member whereby the piston forming element is maintained substantially sealed against contamination within the piston chamber forming member.

12. A pump as claimed in claim 11 wherein the cover member comprises an integral part of the piston chamber forming member and is removable therefrom by breaking of a fragible junction joining the cover member thereto.

13. A pump as claimed in claim 10 wherein the piston chamber forming member includes a radially outwardly extending flange about the inner end adapted for bonding to said membrane.

14. A pump as claimed in claim 10 wherein the piston forming element having an axially extending hollow stem which extends out of said outer end of the piston chamber forming member, the stem having a central passageway ending at an outlet out of which fluid is pumped by reciprocal movement of the piston forming element, and a plug member removably received in the outlet to sealably close the passageway.

15. A pump as claimed in claim 14 wherein said plug member comprises a portion of a removable cover secured to the piston chamber forming member.

16. A pump as claimed in claim 15 wherein the cover comprises an integral part of the piston chamber forming member and is removable by breaking a fragible junction joining the cover member thereto.

17. A pump as claimed in 15 wherein in normal pumping operation, the piston-forming element is reciprocally moved within the piston chamber-forming member between an inward position remote from the outer end and outward position remote from the inner end, the plug member prevents sliding of the piston-forming element outwardly to the outward position.

18. A pump as claimed in claim 17 wherein the cover comprises an integral part of the piston chamber-forming member and is removable by breaking a fragible junction joining the cover member thereto.

19. A pump as claimed in claim 10 wherein in normal pumping operation, the piston forming element is reciprocally moved within the piston chamber forming member between an inward position remote from the outer end and an outward position remote from the inner end, said initial position of the piston forming element being spaced towards the inner end from the inward position whereby in the first movement of the piston forming element from the initial position to the inward position, the cutting element engages the membrane and breaks the membrane.

20. A pump as claimed in claim 10 including a removable cover secured to the piston chamber-forming member substantially preventing access to the piston-forming element.

* * * * *